US010855785B2

(12) United States Patent
Jain et al.

(10) Patent No.: US 10,855,785 B2
(45) Date of Patent: Dec. 1, 2020

(54) PARTICIPANT ENGAGEMENT DETECTION AND CONTROL SYSTEM FOR ONLINE SESSIONS

(71) Applicant: Adobe Inc., San Jose, CA (US)

(72) Inventors: Ajay Jain, Ghaziabad (IN); Sanjeev Tagra, Panipat (IN); Sachin Soni, New Delhi (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/185,925

(22) Filed: Nov. 9, 2018

(65) Prior Publication Data
US 2020/0153915 A1    May 14, 2020

(51) Int. Cl.
*G06F 15/16* (2006.01)
*H04L 29/08* (2006.01)
*G09B 7/00* (2006.01)
*H04L 29/06* (2006.01)

(52) U.S. Cl.
CPC ............... *H04L 67/22* (2013.01); *G09B 7/00* (2013.01); *H04L 65/1069* (2013.01); *H04L 65/403* (2013.01)

(58) Field of Classification Search
CPC ... H04L 67/22; H04L 65/1069; H04L 65/403; G09B 7/00
USPC ............... 709/202–203, 204–206, 223–224
See application file for complete search history.

(56) References Cited

U.S. PATENT DOCUMENTS

| 8,639,704 B2* | 1/2014 | Yerli .................. G06Q 50/00 707/748 |
| 9,426,421 B2* | 8/2016 | Balasaygun ........ H04L 12/1813 |
| 10,204,166 B2* | 2/2019 | Petrescu ............. G06F 16/9535 |
| 10,459,985 B2* | 10/2019 | Shepherd ................ H04L 67/22 |
| 10,617,362 B2* | 4/2020 | Bastide ................... H04M 3/56 |
| 2012/0023457 A1 | 1/2012 | Lai |
| 2012/0203639 A1 | 8/2012 | Webster |
| 2013/0290434 A1 | 10/2013 | Bank et al. |

(Continued)

OTHER PUBLICATIONS

"First Action Interview Office Action", U.S. Appl. No. 16/519,796, dated Apr. 20, 2020, 4 pages.

(Continued)

*Primary Examiner* — Bharat Barot
(74) *Attorney, Agent, or Firm* — SBMC

(57) ABSTRACT

In implementations of a participant engagement detection and control system for online sessions, a computing device implements a participant engagement system to monitor user actions of participants during an online session, and track engagement levels of the participants by mapping the user actions and content of the online session to a timeline of the online session. Engagement scores for the participants are determined based on the mapping of the user actions and the content at each time interval of the timeline. Low-engagement participants having a probability of dropping out of the online session are determined based on the engagement scores. Engaging content is selected as determined to increase an engagement level of the low-engagement participants, and the engaging content is communicated to the low-engagement participants. Furthermore, the engaging content and identifiers of the low-engagement participants can be communicated to a presenter of the online session.

20 Claims, 8 Drawing Sheets

(56) References Cited

U.S. PATENT DOCUMENTS

| | | | |
|---|---|---|---|
| 2013/0339875 A1* | 12/2013 | Sahai | H04L 12/1827 709/204 |
| 2014/0127656 A1 | 5/2014 | Healy et al. | |
| 2014/0278746 A1 | 9/2014 | Kolowich et al. | |
| 2015/0249716 A1* | 9/2015 | Chen | H04L 67/22 709/224 |
| 2016/0259840 A1 | 9/2016 | Zheng et al. | |
| 2016/0261655 A1 | 9/2016 | Aggarwal et al. | |
| 2016/0344779 A1* | 11/2016 | Jain | H04L 65/403 |
| 2017/0223066 A1* | 8/2017 | Grevers, Jr. | H04L 65/1083 |
| 2019/0362317 A1* | 11/2019 | Rogynskyy | H04L 67/306 |

OTHER PUBLICATIONS

"How to Host a Webinar That Will Generate Leads for Your Business", Retrieved at: https://resources.mojomedialabs.com/blog/how-to-host-a-webinar-that-will-generate-leads-for-your-business, Feb. 18, 2017, 6 pages.

"How to Use Webinars Effectively to Generate 1,000's of Leads", Retrieved at: https://warren-knight.com/2017/04/06/how-to-use-webinars-effectively-generate-1000s-leads/, Apr. 6, 2017, 8 pages.

"Pre-Interview First Office Action", U.S. Appl. No. 16/519,796, Mar. 11, 2020, 4 pages.

"Webinars, the No. 1 tool for lead generation", Retrieved at: https://www.webinar.nl/en/news/webinars-the-number-1-tool-for-lead-generation/, Mar. 22, 2018, 2 pages.

Bullock,"Why you need to add webinars to your content marketing strategy", Retrieved at: https://www.wordtracker.com/blog/marketing/why-you-need-to-add-webinars-to-your-content-marketing-strategy, May 30, 2018, 16 pages.

Davidson,"Webinar Marketing Makes an Impact on Lead Generation", Retrieved at: https://www.conferencecalling.com/blog/webinars-for-lead-generation, May 10, 2016, 4 pages.

DiScipio,"Why You Should Use Webinars to Generate Leads (& Who's Doing it Right)", Retrieved at: https://www.impactbnd.com/blog/use-webinars-to-generate-leads—on Jun. 5, 2019, Oct. 28, 2015, 13 pages.

Gardner,"10 Reasons Smart Companies Use Webinars for Lead Gen [Infographic]", Retrieved at: https://unbounce.com/lead-generation/smart-companies-use-webinars/, Jan. 17, 2013, 7 pages.

Howes,"5 Ways to Generate Leads for Webinars", Retrieved at: https://diythemes.com/thesis/webinar-lead-generation/—on Jun. 5, 2019, 5 pages.

Jain, "How to Generate Leads from Webinars", https://aeroleads.com/blog/generate-leads-via-webinars/, Feb. 12, 2019, 10 pages.

McDuffee,"Webinars are the Best Way to Generate Leads", Retrieved at: https://www.mmmatters.com/blog/best-way-to-generate-leads, Feb. 2, 2019, 7 pages.

Talreja,"10 Tips for Generating Business Leads with Free Webinars", Retrieved at: https://www.sitepoint.com/10-tips-for-generating-business-leads-with-free-webinars/, Dec. 1, 2016, 3 pages.

Zomick,"How to Generate Leads with Webinars", Retrieved at: https://blog.marketo.com/2018/01/generate-leads-webinars.html—on Jun. 5, 2019, 10 pages.

"Final Office Action", U.S. Appl. No. 16/519,796, dated Aug. 6, 2020, 14 pages.

* cited by examiner

PARTICIPANT ENGAGEMENT DETECTION AND CONTROL SYSTEM FOR ONLINE SESSIONS

BACKGROUND

Online learning sessions, such as for education, distance learning, webinars, and courses (e.g., massive open online courses (MOOCs)) provide efficient ways for augmenting an individual's knowledge base and disseminating learning materials to a large group of people. In an online learning session, a presenter, such as a college professor, may present materials live to remote participants who can view the materials and presentation on various computing and interface devices, such as a computer, mobile phone, tablet device, and the like. For instance, service providers may offer online courses from a variety of colleges and universities around the globe. In another example, an employer can reduce travel costs by providing online training webinars to remote employees.

Because learning sessions are online (e.g., over a network, such as the Internet), participants in the online learning session are usually remote from each other and from a presenter of the online learning session. Hence, the presenter is not able to observe engagement levels of the participants in the learning session, like the presenter would be able to do in a traditional classroom setting where the presenter and participants are collocated. Moreover, because learning sessions are online, a learning session may include large numbers of participants (e.g., thousands of participants) who have diverse backgrounds, such as from different cultures, geographies, and time zones, speaking different languages, having various educational backgrounds, and the like. For these reasons, it is not humanly possible to adequately track participant engagement in online learning sessions, and it can be difficult or impossible to adequately prevent or discourage participants from dropping out of or disengaging from an online learning session. Accordingly, without use of a computer system, the engagement levels of participants in an online learning session cannot be accurately determined, along with appropriate corrections that may be used to maintain participant engagement.

SUMMARY

Techniques and systems are described to determine and facilitate participant engagement in an online session, such as an online learning session for education, distance learning, webinars, and courses. A computing device, such as a server computing device implemented in a cloud-based system, implements a participant engagement system that accurately determines engagement levels of participants at time intervals of an online session, and facilitates participant engagement, such as by communicating (e.g., in a conversation or a chat message) with low-engagement participants and a presenter of the online session. The participant engagement system obtains indicators of user actions from user devices of participants in an online session, such as from a client application running on the user devices at predetermined time intervals configured by a presenter of the online session. The user actions may include any suitable actions or inputs made by a participant during the online session, such as a user answer to a quiz, participation in a poll or chat, whether a participant has minimized a user interface via which the online session is displayed at a user device, whether a participant has disabled an audio device (e.g., a speaker), whether a participant has replayed content of the online session, and the like.

The participant engagement system generates a mapping that maps user actions and content presented during the online session to a timeline of the online session, where the mapping is based on the indicators of the user actions and the mapping is generated to indicate the user actions and the content at time intervals of the timeline. At each time interval of the timeline, the participant engagement system generates an engagement score for each participant based on the mapping of the user actions and the content, such as by weighting user actions at each time interval, and may rank the participants based on their respective engagement scores. The participant engagement system identifies one or more low-engagement participants from their engagement scores, such as those participants in a bottom percentage of the ranking (e.g., bottom 15%).

Based on the mapping, the participant engagement system can select engaging content determined to increase the engagement level of the low-engagement participants of the online session, and communicates the engaging content to the low-engagement participants, such as via a voice conversation with an electronic assistant, a text message in a chat, and the like. In one example, the participant engagement system determines the engaging content from the mapping by determining the participants in the online session that correlate with one or more of the participants having low engagement, and determines the engaging content from the correlating participants. Notably, the participant engagement system can determine and select the engaging content to increase the engagement level of the low-engagement participants of the online session.

The participant engagement system may also communicate the engaging content and identifiers of the low-engagement participants to a presenter of the online session. Hence, a presenter can adjust the presentation of materials during the online session based on a received list of the identifiers of the low-engagement participants and based on the engaging content, such as by slowing a pace at which slides are changed, going back to a previously-presented slide, speaking another language, and the like.

Accordingly, the participant engagement system accurately determines participant engagement during an online session based on user actions of the participants throughout the online session, and quickly detects low-engagement participants, even for large numbers of remote participants. The participant engagement system also facilitates participant engagement in the online session by actively communicating with the participants and a presenter of the online session, efficiently raising the engagement levels of the low-engagement participants and discouraging them from disengaging from, or dropping out of, the online session.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
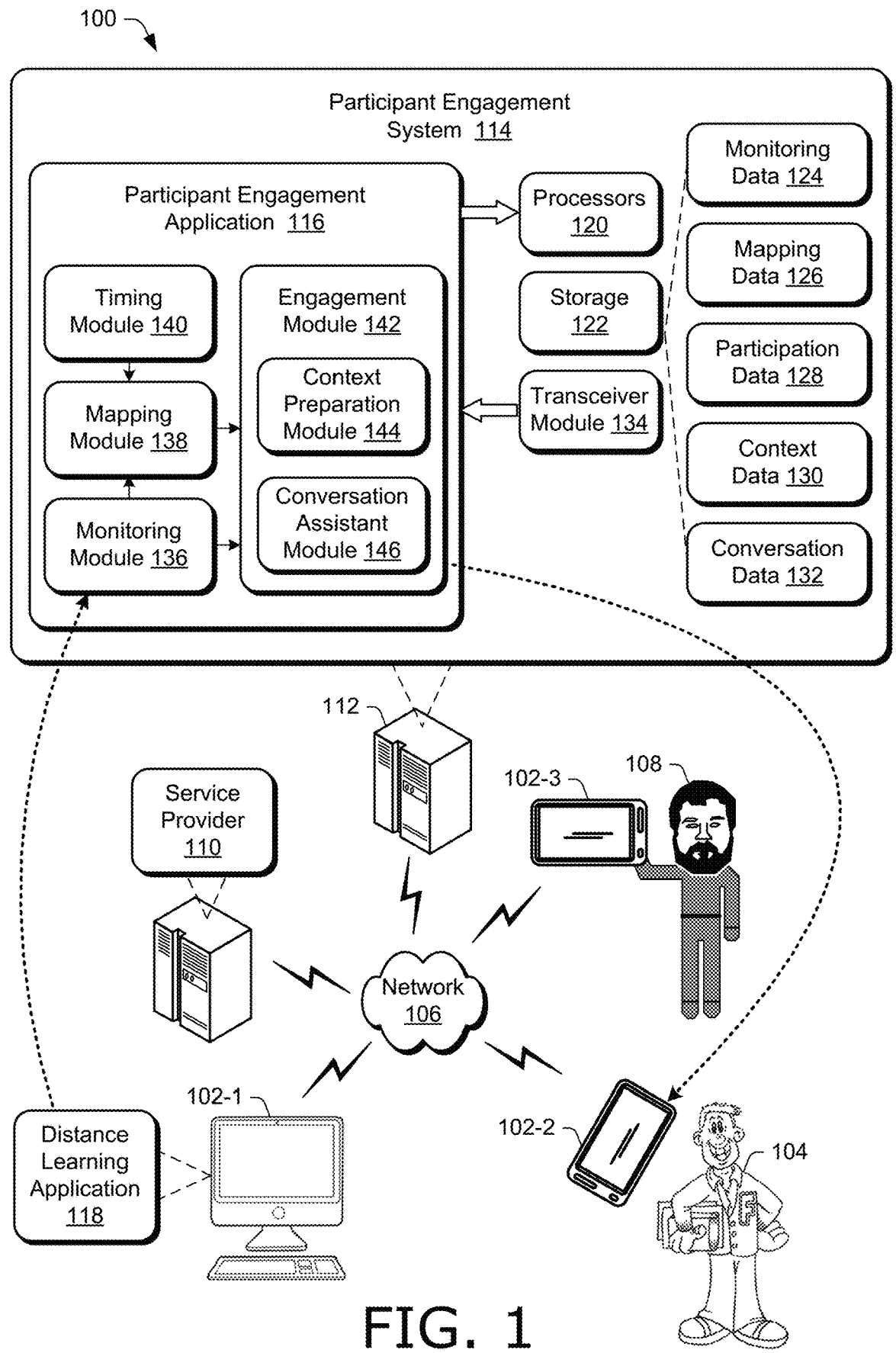
FIG. 1 illustrates a digital medium environment in an example implementation that is operable to employ techniques described herein.

Online sessions, such as online learning sessions, provide efficient ways for augmenting an individual's knowledge base and disseminating learning materials to a large group of people. In an online session, a presenter, such as a teacher, may present materials live to remote participants who "attend" the online session via a user interface displayed on respective user devices. One online session may correspond to a class of an academic course, and the academic course may include multiple online sessions, such as ten separate online sessions. For instance, service providers may offer online courses from a variety of universities around the globe. In another example, an employer can reduce travel costs by providing online training webinars (e.g., online sessions) to global employees.

However, the utility of online sessions is not realized when participants do not remain engaged in the online session via their respective user devices, such as by slowing (or stopping) their level of participation in the online session. Participants may disengage from an online session for any suitable reason, such as an inability to keep up with the material presented during the online session, a lack of understanding of a presenter (e.g., a presenter's native language may be different than a native language of a participant, making it difficult for the participant to understand the presenter), and the like. When a participant is not engaged in the online session, the online session ceases to be efficient and useful for the participant.

For online sessions, participation engagement systems that rely on manual monitoring with human intervention, as is conventionally done in a classroom, are not feasible due to the varied remote locations of participants and the large numbers of participants possible in an online setting. Hence, a computer system is needed to track participant engagement in an online setting, such as for an online learning session. Conventional participation engagement systems, however, such as operated by a service provider hosting an online session, do not accurately and regularly track user actions during the online session. Therefore, conventional participation engagement systems are not suitable to adequately prevent or discourage participants from dropping out of or disengaging from an online session, such as by communicating content determined from user actions obtained throughout the online session and selected to increase a participant's engagement level.

Accordingly, this disclosure describes systems, devices, and techniques for determining and facilitating participant engagement in online sessions, such as online learning sessions for education, distance learning, webinars, and courses. A computing device, such as a server computing device implemented in a cloud-based system, implements a participation engagement system that obtains indicators from user devices of participants in an online session. In one example, a distance learning application is enabled on client devices of users who participate in an online learning session, and supplies indicators of user actions to the participation engagement system on the server device. For instance, a distance learning application may record indicators of user actions and parameters of the client device during the online learning session. At predetermined times (e.g., at periodic intervals during the online learning session), the distance learning application of a user device of a participant in the online learning session may communicate (e.g., over a network) indicators of user actions and parameters of the user device to the server operating the participant engagement system. The participant engagement system determines engagement levels of the participants based on user actions and takes actions with participants, a presenter, or both to facilitate participant engagement, such as when one or more participants of the online learning session have engagement levels below a threshold engagement level.

In one example, the participant engagement system implemented by the server computing device generates a mapping that maps online session content and user actions indicated by indicators obtained from user devices to a timeline of an online session, where the mapping indicates the user actions at time intervals of the timeline. The timeline can be configured by a presenter of the online session, and the mapping can be based on time intervals of the timeline, such as by including, for each time interval, user actions that occurred during the time interval and content of the online session presented during the time interval. Based on the mapping, the participant engagement system determines one or more of the participants of the online session that may have an engagement level below a threshold engagement level, such as by generating an engagement score for each participant from the indicators obtained from the user devices, and determining the low-engagement participants from the engagement scores.

In one example, the participant engagement system compares engagement scores for each participant at each time interval to a threshold engagement score to determine the low-engagement participants having an engagement level in the online session below the threshold engagement level. Additionally or alternatively, the participant engagement system may rank participants according to their engagement scores, and a threshold percentage of the participants can be selected as participants having an engagement level in the online session below a threshold engagement level (e.g., low-engagement participants), such as those participants in the bottom 15% according to their engagement scores.

The participant engagement system can determine and select engaging content for increasing an engagement level in the online session of the low-engagement participants. In one example, the participant engagement system determines content from the mapping of user actions to the timeline of the online session. For instance, based on the mapping, it may be determined that a participant played back particular content presented by the presenter of the online session, and did not engage further in the online session. Accordingly, the participant engagement system may determine content related to the particular content played back by the participant, such as prerequisite or primer content for the particular content played back by the participant, and communicate this content to the participant (e.g., in a voice conversation or chat message), thereby encouraging the participant to engage or re-engage in the online session, rather than disengage from, or drop out of, the session.

Additionally or alternatively, the participant engagement system may determine participants in the online session that correlate with low-engagement participants. In one example, other participants that do not have a low engagement in the online session may correlate with one or more of the low-engagement participants. Hence, the participant engagement system may pair (e.g., via a conversation or chat message) the low-engagement participants in the online session with other participants that do not have low engagement in the online session, to assist the low-engagement participants. Additionally or alternatively, the other participants that correlate with one or more participants having low engagement can include participants also having low engagement. Hence, the participant engagement system may pair (e.g., via a conversation or chat) participants in the learning session having low engagement with other participants also having low engagement in the learning session.

In one example, the participant engagement system communicates identifiers of participants and indicators of content to a presenter of the online session. For instance, the identifiers of the low-engagement participants (e.g., participants having respective engagement levels below a threshold engagement level) can be communicated to a presenter of the online session. Additionally or alternatively, indicators of the content presented in the online session during a timeframe in which participant engagement levels are below a threshold engagement level can be communicated to a presenter of the online session. Accordingly, the presenter can adjust the presentation of materials during an online session based on a received list of participants, content, or both, such as by slowing a pace at which slides are changed, going back to a previously-presented slide, speaking another language, and the like, to improve participant engagement and discourage a participant from disengaging from, or dropping out of, the online session.

In the following discussion an example digital medium environment is described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the described techniques. The illustrated digital medium environment 100 includes computing devices 102, such as a computer 102-1 (e.g., a desktop computer or laptop computer), a smart phone 102-2, and a tablet device 102-3. The computing devices 102 are examples of user devices (e.g., client devices) and are depicted in FIG. 1 as a desktop computer, a tablet device, and a smartphone as the example computing devices. Generally, the computing devices 102 can be any suitable computing device, such as a mobile phone, tablet, laptop computer, desktop computer, gaming device, goggles, glasses, wearable device (e.g., a wristband, watch, or headband), camera, digital assistant, echo device, navigation device, home appliance, copier, scanner, test and measurement equipment, vehicle computing system, and the like. Hence, computing devices 102 may range from a full resource device with substantial memory and processor resources (e.g., personal computers, game consoles) to a low-resource device with limited memory or processing resources (e.g., mobile devices).

Various types of input devices and input instrumentalities can be used to provide input to computing devices 102. For example, computing devices 102 can recognize input as being a mouse input, stylus input, touch input, input provided through a natural user interface, and the like. Thus, computing devices 102 can recognize multiple types of gestures including touch gestures and gestures provided through a natural user interface. In one example, computing devices 102 include speech recognition, identification, and synthesis functionalities, microphones, and speakers that allow computing devices 102 to communicate with a user in a conversation, e.g., a user conversation.

Figure 8:
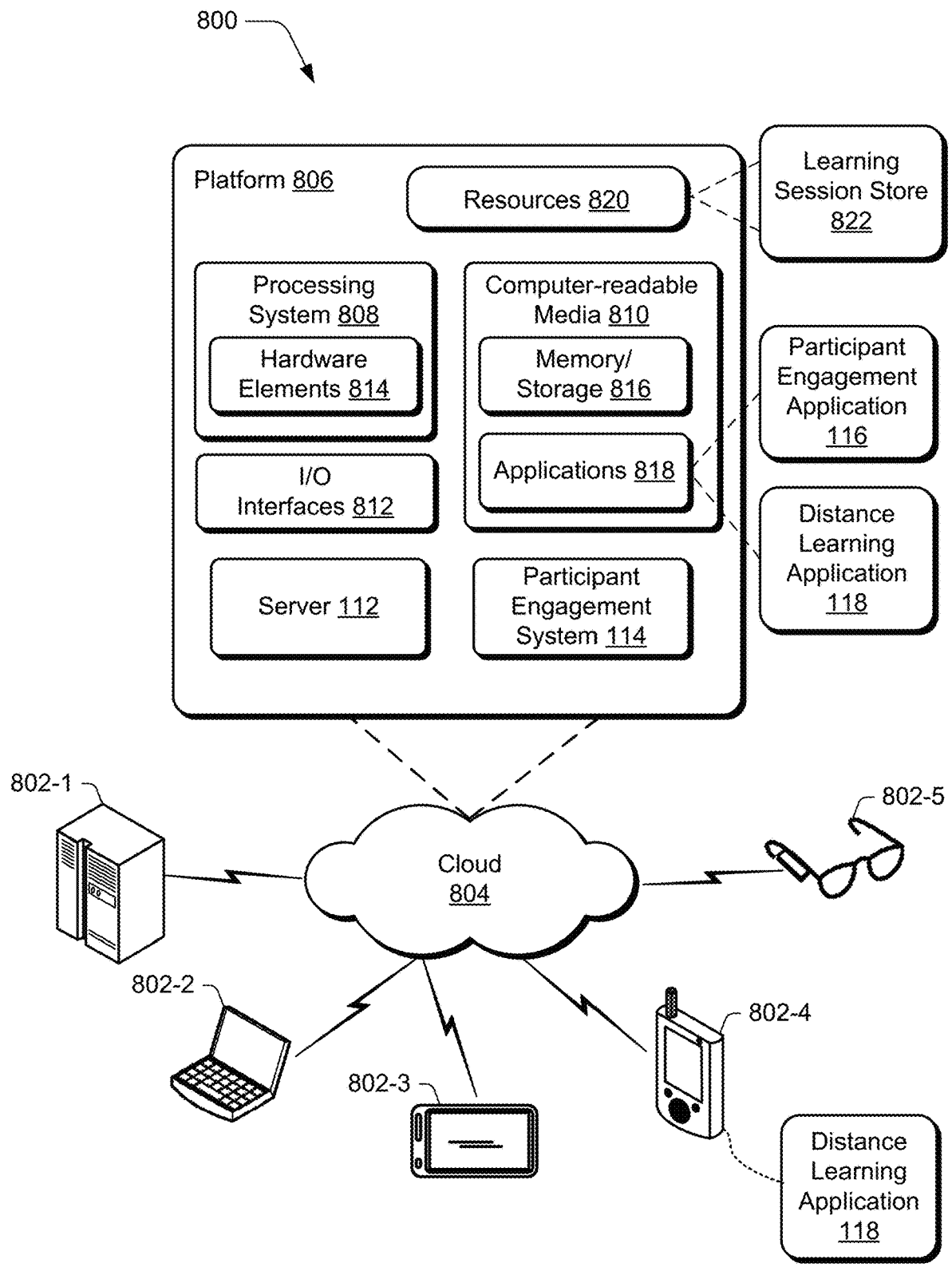
FIG. 8 illustrates an example system including various components of an example device that can be implemented as any type of computing device as described and/or utilized with reference to FIGS. 1-7 to implement aspects of the techniques described herein.

Furthermore, each of computing devices 102 may be representative of one or a plurality of different devices, such as one or more devices connected to a network that perform operations "over the cloud" as further described in relation to FIG. 8. In one example, at least one of computing devices 102 includes a plurality of computing devices communicatively coupled to each other, such as with a low power wireless communication standard (e.g., a Bluetooth® protocol). In the example in FIG. 1, the computing devices 102 denote user devices of participants in an online session, such as an online learning session. Hence, participant 104 is illustrated proximate to computing device 102-2 to indicate that participant 104 is operating computing device 102-2. For clarity, respective participants of some computing devices 102 are omitted from FIG. 1.

Participants (including participant 104) using the computing devices 102 participate in an online session over network 106 with presenter 108. For instance, presenter 108 may be a teacher, professor, boss, entrepreneur, and the like, and operates computing device 102-3 to present materials (e.g., slides, videos, text, assets, etc.) in an online session that is exposed for participants via a user interface on the respective computing devices 102. In one example, the online session is hosted by service provider 110. Service provider 110 can be any suitable service provider that hosts an online session (e.g., an online learning session, webinar, conference, etc.) over network 106, such as Coursera, edX, Adobe Connect, WebEx, Skype, GoToMeeting™, and the like.

Service provider 110 may include one or more servers or service providers that provide services and/or resources to computing devices 102. Generally, resources provided by service provider 110 may be licensed, purchased, or may be made freely available, (e.g., without authentication, license, or account-based access). The resources can include any suitable combination of services and content, such as made available over network 106 by one or more providers. Some examples of services include, but are not limited to, an online learning-session service, an online shopping service, a photo editing service, an image database service, a web development and management service, a collaboration service, a social networking service, a messaging service, an advertisement service, a graphics design service, an image storage service (including storage and access of photos, documents, records, files, and the like), and so forth. Content may include various combinations of assets, including learning session materials, videos, ads, audio, multi-media streams, animations, images, web documents, web pages, applications, device applications, text documents, drawings, presentations, stock photographs, user profiles, user preferences, user data, and the like.

Network 106 communicatively couples computing devices 102 with each other, service provider 110, and server 112. Network 106 may include a variety of networks, such as the Internet, an intranet, local area network (LAN), wide area network (WAN), personal area network (PAN), cellular networks, terrestrial networks, satellite networks, combinations of networks, and the like, and as such may be wired, wireless, or a combination thereof.

Server 112 can include any suitable number of servers, and may be representative of one or a plurality of different devices. Server 112 includes participant engagement system 114 that includes participant engagement application 116 (discussed below in more detail) to determine and facilitate participant engagement in an online session. In one example, participant engagement system 114 obtains data collected by distance learning application 118 on one or more of computing devices 102. For instance, each of computing devices 102 include an instantiation of the distance learning application 118. For clarity, only computing device 102-1 is illustrated in FIG. 1 as including the distance learning application 118.

Distance learning application 118 is representative of functionality configured to manage data regarding an online session on computing devices 102. In one example, distance learning application 118 exposes a user interface on computing devices 102 to facilitate the online session. For instance, distance learning application 118 may be provided to computing devices 102 by service provider 110 and configured according to configuration parameters provided by presenter 108, such as parameters that designate to report indicators of user actions at predetermined times during the online session.

Distance learning application 118 can record data indicative of any suitable user actions during an online session, such as minimizing a user interface that exposes the learning session, turning off a sound device, rewinding a part of the learning session, pausing a topic of the learning session, answering a quiz of the learning session, entering a selection in a poll of the learning session, entering text in a chat of the learning session, and the like. In one example, distance learning application 118 communicates indicators of user actions via network 106 to participant engagement system 114 of server 112 (this communication is illustrated in FIG. 1 with an arrow coupling distance learning application 118 to a monitoring module of participant engagement application 116). Additionally or alternatively, distance learning application 118 can include a copy of the participant engagement application 116.

Participant engagement system 114 improves participant engagement in an online session by determining an engagement level of participants, determining one or more participants having an engagement level below a threshold engagement level, and forming one or more communications (to participants, a presenter, or both) to prevent a participant from disengaging from, or dropping out of, the online session.

Participant engagement system 114 includes participant engagement application 116 (discussed below in more detail). Participant engagement system 114 also includes processors 120, which can include any suitable number and any suitable type of processor. In one example, participant engagement system 114 is implemented at least partially by storing instructions on storage 122 and executing the instructions on processors 120 included in participant engagement system 114. For instance, processors 120 may execute portions of participant engagement application 116.

Participant engagement system 114 includes storage 122, which can be any suitable type of storage accessible by or contained in participant engagement system 114. Storage 122 stores data in memory, and provides access to and from memory included in storage 122 for any suitable type of data. For instance, storage 122 includes monitoring data 124, including data associated with participants and user devices in an online session, such as indicators of user actions (e.g., participant actions and presenter actions, such as presenter actions that change displayed content during the online session, a designator of a rate at which the displayed content is changed, a language spoken by the presenter, etc.), configuration settings of user devices (e.g., indications of whether a sound device is enabled or disabled on a user device of a participant), text typed into a chat window during an online session, text removed from a chat window during an online session, quiz questions, poll questions, participant identification numbers, timestamps of the online session, data identifying a service provider that hosts an online session, participant data and user device data from previous online sessions (e.g., previous classes of a multi-class course), combinations thereof, and the like.

Storage 122 also includes mapping data 126, including data regarding a mapping of user actions to a timeline of an online session, such as time intervals of the online session, data structures indicating a time interval of the learning session, content presented during the time interval, a user action during the time interval, and an indicator of an algorithm or software version used to generate the mapping, combinations thereof, and the like.

Storage 122 also includes participation data 128, including data regarding participant engagement an online session, such as engagement scores of participants, rankings of participants, such as rankings according to engagement scores, groupings of participants, such as groupings of participants having low-, medium-, and high-engagement levels, content for which participants are determined to have low or high engagement, a time interval of the online session for which participants are determined to have low or high engagement, thresholds (e.g., threshold engagement levels, threshold scores, percentage thresholds used to determine a group of participants having low engagement, etc.), combinations thereof, and the like.

Storage 122 also includes context data 130, including data regarding a participant of an online session, such as a participant of an online session having an engagement level below a threshold engagement level, as well as other participants of the online session that correlate to the participant session having an engagement level below the threshold engagement level (e.g., participants also having a low engagement level, participants having a high engagement level, participants having a low engagement level for common content, etc.), content based on participants that correlate to a participant having an engagement level below a threshold engagement level (e.g., content from a chat, question, poll, or quiz), content determined to increase an engagement level of a participant in an online session, combinations thereof, and the like.

Storage 122 also includes conversation data 132, including data regarding a communication with a participant or presenter in an online session or a service provider hosting the online session, such as chat, spoken conversation, telephone call, text message, etc., including a transcript of a communication, a recording of a communication, a translation of a communication from a first language to a second language, a duration of a communication, a number of characters in a communication, user preferences indicating a type of communication preferred by a participant, such as a chat, text, or phone call, a phone number, computer number, or identification number for a participant that can be used to communicate with the participant, a number and identification of participants in a communication, an indicator of whether a presenter is included in the communication, combinations thereof, and the like.

Participant engagement system 114 also includes transceiver module 134, which is representative of functionality configured to transmit and receive data using any suitable type and number of communication protocols. For instance, data within participant engagement system 114 may be transmitted to one of computing devices 102 with transceiver module 134 over network 106. Furthermore, data can be received from one of computing devices 102 with transceiver module 134. In one example, transceiver module 134 communicates packetized data.

Participant engagement system 114 includes participant engagement application 116. Participant engagement application 116 includes monitoring module 136, mapping module 138, timing module 140, and engagement module 142, which also includes context preparation module 144, and conversation assistant module 146. These modules work in conjunction with each other to determine and facilitate participant engagement in an online session. Although generally shown and described as separate modules of the participant engagement application, any one or combination of the modules may be implemented together as a multi-function module, or independently as components of the participant engagement application.

Monitoring module 136 is representative of functionality configured to obtain any suitable data regarding participant engagement in an online session. Monitoring module 136 can obtain data for an online session from any suitable source in any suitable way. In one example, monitoring module 136 obtains respective indicators from a plurality of user devices indicating respective user actions during an online session. For instance, distance learning application 118 on computing devices 102 may record on computing devices 102 data indicative of user actions, device configurations, combinations thereof, and the like, and monitoring module 136 may obtain respective indicators of user actions from computing devices 102. In one example, monitoring module 136 obtains respective indicators of user actions from computing devices 102 based on a timeline of an online session, such as periodically at time intervals configured by presenter 108.

Additionally or alternatively, monitoring module 136 can obtain data for an online session from a user device of a presenter, such as computing device 102-3 of presenter 108. Hence, monitoring module 136 can obtain indicators of user actions including presenter actions, such as presenter 108 changing displayed content during an online session. Additionally or alternatively, indicators obtained by monitoring module 136 can include a designator of a rate at which displayed content is changed, such as one slide per ninety seconds to designate that the presenter changes a slide on average every ninety seconds.

In one example, monitoring module 136 obtains data regarding participant engagement in an online session from a service provider, such as service provider 110 that hosts an online learning session. For instance, distance learning application 118 of computing devices 102 may communicate data regarding participant engagement in an online session, such as indicators of user actions, user device configuration settings, and the like to service provider 110, and monitoring module 136 may obtain data regarding participant engagement in the online session from service provider 110.

Monitoring module 136 can obtain data including indicators of any suitable user actions during an online session, such as minimizing a user interface that exposes an online session, turning off a sound device, rewinding a part of an online session, pausing a topic of an online session, answering a quiz of an online session, entering a selection in a poll of an online session, entering text in a chat of an online session, combinations thereof, and the like. Examples of user actions for participants in an online session and a presenter of the online session obtained by monitoring module 136 are included in Table 1.

TABLE 1

Examples of User Actions for Participants and Presenters in an Online Session

| | |
|---|---|
| Participants | Online class solution used by participant (e.g., Coursera, Skype, etc.) |
| | Screen activeness (e.g., screen in focus and viewable, or minimized) |
| | Sound device switched on or off |
| | Movement of cursor (e.g., whether participant moves cursor to chat window during an active chat) |
| | Participation in polls, quizzes, and chats (e.g., no participation, such as no response to poll, quiz, or chat; simple participation, such as terse answers (e.g., yes/no answers); or active participation, such as influencing topics) |
| | Rate of chat messaging as private (e.g., anonymous), public, or both |
| | Vocal involvement during online session (e.g., answering a question, asking a question, replying when name is spoken) |
| | Language proficiency in spoken content (e.g., when asking a question) or written content (e.g., in a chat) |
| | Frequency of rewinding content |
| | Frequency of pausing content |
| | Playback speed of content (e.g., faster or slower than real time) |
| | Correctness of answers in quizzes and polls |
| | Time delay when answering polls, chats, quizzes, and questions |

TABLE 1-continued

Examples of User Actions for Participants and Presenters in an Online Session

| | |
|---|---|
| Presenter | Speed at which content is presented (e.g., how fast a presenter changes slides) |
| | Number or duration of breaks between topics |
| | Number of topics repeated |
| | Number and duration of replies when presenter asks a question |
| | Language proficiency in spoken content |
| | Use of color coding of materials (could confuse color-blind participants) |
| | Neatness of written content (e.g., easily readable text or difficult-to-read hand-written script) |
| | Proficiency in operating audio/visual equipment |

Accordingly, monitoring module 136 can obtain data regarding participant engagement in an online session in any suitable format, such as audio recordings of user questions and answers, transcripts of user questions and answers, text of chats, data structures indicating a time interval of an online session, content presented during the time interval, and a user action during the time interval, images, videos, slides, combinations thereof, and the like.

Data regarding an online session obtained by monitoring module 136, along with any suitable information, such as indicators of user actions, indicators of device configurations, timestamps corresponding to indicators, content presented during an online session at timestamps corresponding to indicators, text of chats, audio recordings of user questions and answers, text transcriptions of user questions and answers, data structures indicating a time interval of an online session, content presented during the time interval, and a user action during the time interval, combinations thereof, and the like, used by or calculated by monitoring module 136 are stored in monitoring data 124 of storage 122 and made available to modules of participant engagement application 116. In one example, monitoring module 136 provides indicators of user actions to mapping module 138.

Mapping module 138 is representative of functionality configured to map user actions and content to a timeline of an online session to produce a mapping. Mapping module 138 can generate a mapping in any suitable way. In one example, mapping module 138 receives indicators of user actions from monitoring module 136 and a timeline from timing module 140, and generates a mapping from the user actions and the timeline. Additionally or alternatively, mapping module 138 can receive data structures indicating a time (e.g., a time interval) of an online session and a user action during the time interval from monitoring module 136, and a timeline from timing module 140. Mapping module 138 can generate a mapping from the user actions and the timeline by assigning the time intervals from monitoring module 136 to the timeline from timing module 140. For instance, mapping module 138 may receive a data structure from monitoring module 136 indicating that a participant performed an action at a time interval indicated by designator "Tx", and assign the action to a time on a timeline provided by timing module 140 corresponding to a time interval designated by Tx, such as from a nine-minute timestamp to a twelve-minute timestamp for a three minute time interval.

In one example, distance learning application 118 records indicators of user actions and device settings during an online session together with an indicator of time, such as a timestamp, time interval, and the like. Indicators of user actions and device settings are obtained by monitoring module 136 and provided to mapping module 138. Hence, mapping module 138 can map the user actions and device settings to a timeline provided from timing module 140 using the indicators of time recorded with the indicators of user actions and device settings by distance learning application 118 to produce a mapping that indicates user actions at time intervals of the timeline.

Figure 2:
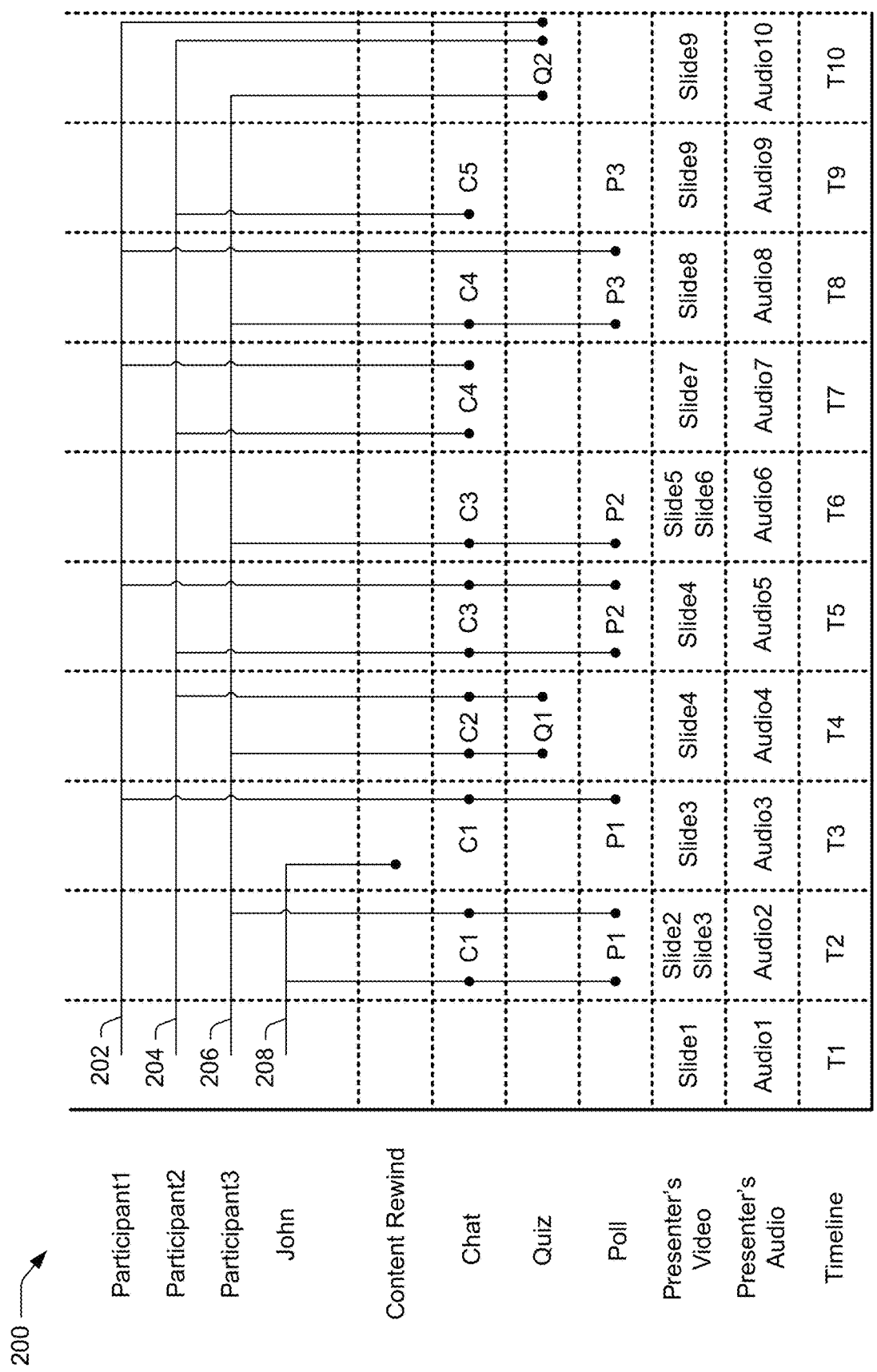
FIG. 2 illustrates an example mapping of user actions and online-session content to a timeline of the online session in accordance with one or more aspects of the disclosure.

Mapping module 138 can map any suitable data regarding an online session, such as user actions, presenter actions, content, user device configurations, and the like to a timeline of the online session. Furthermore, mapping module 138 can map data regarding any suitable number of participants and presenters to a timeline of an online session. An example mapping of user actions and online-session content (e.g., learning-session content) to a timeline of the online session in accordance with one or more aspects of the disclosure and generated by mapping module 138 is illustrated in FIG. 2. FIG. 2 includes example mapping 200 for four participants (Participant1, Participant2, Participant3, and John) and an online session broken into ten time intervals T1, T2, . . . T10. For instance, for a one hour-long online session, each time interval may span six minutes of the online session.

Mapping 200 includes presenter's audio and video for each of the time intervals T1, T2, . . . T10. For instance, during time interval T1, the presenter presents Slide 1 and speaks Audio1, and during time interval T2, the presenter presents Slide2 and Slide3, and speaks Audio2. Mapping 200 illustrates the presenter's video as slides for clarity, though a presenter can present any suitable format of visual materials, such as an image, video (e.g., movie), animation, presentation slides, documents, combinations thereof, and the like.

Mapping 200 also includes indications of polls, quizzes, and chats conducted during the online session. For instance, mapping 200 indicates poll Pb was open during time interval T1 and time interval T2, poll P2 was open during time interval T5 and time interval T6, and poll P3 was open during time interval T8 and time interval T9. A poll can include any suitable question related to the online session, such as "Who was president first, Abraham Lincoln or Thomas Jefferson" during an online session regarding a history on United States politics. Mapping 200 also indicates quiz Q1 was open during time interval T4 and quiz Q2 was open during time interval T10. Mapping 200 also indicates that five chats occurred during the online session, chat C1 during time interval T2 and time interval T3, chat C2 during time interval T4, chat C3 during time interval T5 and time interval T6, chat C4 during time interval T7 and time interval T8, and chat C5 during time interval T9.

Mapping 200 maps user actions for four participants (Participant1, Participant2, Participant3, and John) to time intervals T1, T2, . . . T10 of the online session. User actions for Participant1 are denoted by designator 202, user actions for Participant2 are denoted by designator 204, user actions for Participant3 are denoted by designator 206, and user actions for participant John are denoted by designator 208. In the example in FIG. 2, designator 202 denotes that Participant1 participated in chat C1 and poll P1 during time interval T3, chat C3 and poll P2 during time interval T5, chat C4 during time interval T7, and quiz Q2 during time interval T10.

Designator 204 denotes that Participant2 participated in chat C2 and quiz Q1 during time interval T4, chat C3 and poll P2 during time interval T5, chat C4 during time interval T7, chat C5 during time interval T9, and quiz Q2 during time interval T10.

Designator 206 denotes that Participant3 participated in chat C1 and poll P1 during time interval T2, chat C2 and quiz Q1 during time interval T4, chat C3 and poll P2 during time interval T6, chat C4 and poll P3 during time interval T8, and quiz Q2 during time interval T10.

Designator 208 denotes that participant John participated in chat C1 and poll P1 during time interval T2, rewound content of Slide3 during time interval T3, and shows no more participation in the online session after time interval T3. Hence, participant John is a low-engagement participant and is at risk of disengaging from, or dropping out of, the online session.

Returning to FIG. 1, a mapping generated by mapping module 138, along with any suitable information, such as participant identifiers, data structures for participants, such as data structure indicating a time interval of an online session, content presented during the time interval, and a user action during the time interval, chat topics, presentation content (e.g., slides and audio), mappings of previous online sessions (e.g., previous classes in a multi-class learning session), combinations thereof, and the like, used by or calculated by mapping module 138 are stored in mapping data 126 of storage 122 and made available to modules of participant engagement application 116. In one example, mapping module 138 provides a mapping of user actions to a timeline of an online session to engagement module 142 and context preparation module 144.

Timing module 140 is representative of functionality configured to generate and manage a timeline of an online session. In one example, timing module 140 generates a timeline of a learning session by assigning time intervals to a duration of an online session, such as equally-spaced time intervals T1, T2, . . . T10 in FIG. 2. Additionally or alternatively, time intervals of a timeline can be user configured. For instance, a presenter of an online session can provide configuration parameters to timing module 140 to indicate a number of time intervals for an online session, such as ten to indicate to break up an online session into ten equally-spaced time intervals. Additionally or alternatively, a presenter may provide a duration of time intervals to timing module 140 to configure a timeline, such as a parameter designating six minutes, so that a one-hour online session has a timeline including ten equally-spaced six minute time intervals.

In one example, timing module 140 generates timestamps from a counter (e.g., a clock) during an online session. A timestamp can be any suitable indicator of a clock or counter, such as a number, a word, a position (e.g., a position of an address in a memory, a digitization of a position of an analog clock arm, etc.), combinations thereof, and the like. Timestamps generated by timing module 140 can be included in a timeline generated by timing module 140. For instance, a timeline generated by timing module 140 may include time intervals, timestamps, combinations thereof, and the like.

Additionally or alternatively, a timeline generated by timing module 140 may be communicated to distance learning application 118 of computing devices 102. In one example, timing module 140 communicates an indication of time intervals, such as a list of time intervals, a number of equally-spaced time intervals (e.g., ten), combinations thereof, and the like, to distance learning application 118. Distance learning application 118 can generate any suitable clock based on a timeline, time intervals, or any other timing information from timing module 140. Hence, distance learning application 118 may record user actions and device settings during an online session together with an indicator of time, such as a timestamp (e.g., "9:03" to designate nine minutes and three seconds from the start of an online session), a time interval (e.g., "T3 " to designate a third time interval in a sequence of time intervals that span an online session), and the like.

A timeline generated by timing module 140, along with any suitable information, such as timestamps, time intervals, configuration parameters (e.g., presenter-specified parameters to set a number of time intervals that span an online session), durations (e.g., durations of time intervals, current or previous online sessions, etc.), combinations thereof, and the like, used by or calculated by timing module 140 are stored in storage 122 and made available to modules of participant engagement application 116. In one example, timing module 140 provides a timeline of an online session to mapping module 138.

Engagement module 142 is representative of functionality configured to determine one or more participants in an online session having an engagement level in the online session below a threshold engagement level. Engagement module 142 can determine one or more participants having an engagement level below a threshold engagement level in any suitable way. In one example, engagement module 142 receives a mapping from mapping module 138, and determines one or more participants having an engagement level in an online session below a threshold engagement level based on the mapping received from mapping module 138. Additionally or alternatively, engagement module 142 receives indicators of user actions from monitoring module 136, and determines one or more participants having an engagement level in an online session below a threshold engagement level based on the indicators of user actions received from monitoring module 136.

In one example, engagement module 142 determines a respective engagement score for each participant in an online session. For instance, indicators of user actions obtained by monitoring module 136, such as listed in Table 1, for each participant are each assigned a respective weight by engagement module 142. An engagement score for a participant can be determined from the respective weights for the participant, such as by summing the respective weights, averaging the respective weights, forming a weighted combination of values assigned to user actions, and the like.

Engagement module 142 can generate engagement scores for participants at any suitable rate. In on example, engagement module 142 determines a new engagement score for each participant at predetermined time intervals of an online session, such as at T1, T2, . . . T10 in FIG. 2. An engagement score generated by engagement module 142 can be based on any suitable time period. For instance, engagement module 142 may compute an engagement score at a current time interval, TN, using weights for participants from the current time interval and weights for participants from previous time intervals, TM (M<N).

In one example, engagement module 142 ranks participants based on their respective engagement scores, and determines one or more participants having an engagement level below a threshold engagement level based on the ranking. For instance, engagement module 142 may assign a percentage of the participants based on the ranking, such as the bottom 10%, as one or more participants having an engagement level below a threshold engagement level (e.g., low-engagement participants).

Additionally or alternatively, engagement module 142 may form a plurality of groups of participants based on a ranking of the participants according to their respective engagement scores. For instance, engagement module 142 may form three groups of participants. A first group includes high-scoring participants, such as participants having respective engagement scores above a first threshold score, or participants in a highest-scoring percentile (e.g., top 10%). A third group includes low-scoring participants, such as participants having respective engagement scores below a second threshold score, or participants in a lowest-scoring percentile (e.g., bottom 10%). A second group includes mid-scoring participants, such as participants not included in the first group or the third group. Engagement module 142 may determine participants in the third group as one or more participants having an engagement level below a threshold engagement level. In one example, engagement module 142 assigns participants having respective engagement scores below a threshold engagement score, such as 50%, as one or more low-engagement participants having an engagement level below a threshold engagement level.

Additionally or alternatively, engagement module 142 may assign priorities to low-engagement participants having an engagement level below a threshold engagement level. For instance, those participants that are determined to have an engagement level below a threshold engagement level and also satisfy a disengagement criteria may be indicated as high priority so that conversation assistant module 146 can communicate to them without delay (e.g., before other participants) in an attempt to prevent them from disengaging from the online session. A disengagement criteria can be any suitable criteria, such as having an engagement score less than a threshold engagement score for one or more time intervals, e.g., for three consecutive time intervals of an online session, having engagement scores decline at a rate greater than a threshold decline rate, failing to participate in a class event, e.g., a quiz, providing one or more incorrect answers on one or more quizzes, combinations thereof, and the like.

An indication of one or more participants having an engagement level below a threshold engagement level determined by engagement module 142, along with any suitable information, such as participant identities (e g , names, identification numbers, etc.), engagement scores, statistics of engagement scores (e.g., mean, standard deviation, maximum, minimum, etc.) rankings of participants, thresholds used to determine participants having an engagement level below a threshold engagement level, an indication of a disengagement criteria used to prioritize participants, indications of priority, combinations thereof, and the like, used by or calculated by engagement module 142 are stored in storage 122 and made available to modules of participant engagement application 116. In one example, engagement module 142 provides a list of low-engagement participants to context preparation module 144.

Context preparation module 144 is representative of functionality of the engagement module 142 configured to determine content, participants, or content and participants to increase an engagement level of a participant in an online session. Context preparation module 144 can determine content, participants, or content and participants to increase an engagement level of a participant in an online session in any suitable way. In one example, context preparation module 144 determines participants of an online session that correlate to one or more participants having an engagement level below a threshold engagement level determined by engagement module 142. For instance, context preparation module 144 may determine correlating participants based on a mapping provided by mapping module 138. Context preparation module 144 can determine content for increasing an engagement level of one or more low-engagement participants having an engagement level below a threshold engagement level based on the correlating participants. As an example, context preparation module 144 may identify from a mapping a participant that chatted with a low-engagement participant, and determine content to recommend to the low-engagement participant from a question asked by the participant who chatted with the low-engagement participant.

Additionally or alternatively, context preparation module 144 can determine content, participants, or content and participants to increase an engagement level of a participant in an online session based on data structures that include indicators of user actions during the online session, such as data structures obtained by monitoring module 136 and used to generate a mapping by mapping module 138. For instance, indicators of user actions can be packaged in respective data structures for respective participants of an online session, such as by distance learning application 118, monitoring module 136, or mapping module 138. Each data structure can indicate an suitable data regarding a user action and the online session, such as a time interval of the learning session, content presented during the time interval, and a user action during the time interval.

In one example, a data structure for a participant is of the form:

```
Sruct ParticipantName
{
    Class_session Timeline;
    Class Content;
    Presenter's Audio;
    Class_session Events;
    User's Actions;
}
```

Accordingly, context preparation module 144 can determine content, participants, or content and participants to increase an engagement level of a participant in an online session by comparing and correlating contents of data structures for different participants. As an example, refer again to mapping 200 illustrated in FIG. 2. For the four participants (Participant1, Participant2, Participant3, and John) in the example in FIG. 2, example data structures may include:

Participant1 {T3: Audio3: Slide3: C1: P1}
   {T5: Audio5: Slide4: P2}
   {T7: Audio7: Slide7: C4}
   {T10: Audio10: Slide10: Q2}
Participant2 {T4: Audio4: Slide4: C2: Q1}
   {T5: Audio5: Slide4: C3: P2}
   {T7: Audio7: Slide7: C4}
   {T9: Audio9: Slide9: C5}
   {T10: Audio10: Slide10: Q2}
Participant3 {T2: Audio3: Slide2: Slide3: C1: P1}
   {T4: Audio4: Slide4: C2: Q1}

{T6: Audio6: Slide5: Slide6: C3: P2}
{T8: Audio8: Slide8: C4: P3}
{T10: Audio10: Slide10: Q2}
John {T2: Audio3: Slide2: Slide3: C1: P1}
{T3: Audio3: Slide3: Rewind}

Based on participant John's lack of engagement, as denoted by participant John's data structure, engagement module 142 determines participant John to be a participant having an engagement level below a threshold engagement level based and likely to disengage from the online session. Using the above data structures, context preparation module 144 finds participants that correlate with participant John, such as by correlating contents of the data structures with the contents of the data structure of John. For instance, John's data structure above indicates that participant John participated in chat C1 and poll P1 during time interval T2, rewound content of Slide3 during time interval T3, and shows no more participation in the online session after time interval T3. Accordingly, context preparation module 144 may correlate data structures of other participants with John's data structure and determine that Particpant3 also participated in chat C1 and poll P1 during time interval T2, and that Participant1 participated in chat C1 and poll P1 during time interval T3, rather than time interval T2. Hence, context preparation module 144 may determine that Participant1, Participant3, or both Participant1 and Participant3 correlate to participant John.

Additionally or alternatively, context preparation module 144 may determine content for increasing John's engagement level based on participants that correlate with John, such as Participant1 and Participant3. Context preparation module 144 may determine content for increasing John's engagement level based on Participant1 and Participant3 in any suitable way, such as an action performed by one or both of Participant1 and Participant3. For instance, both Participant1 and Participant3 also participated in chat C4 and poll P3 during time interval T8, during which the presenter presented Slide8. Hence, context preparation module 144 may determine that Slide8 includes content for increasing John's engagement level. Additionally or alternatively, context preparation module 144 may determine that one of Participant1 and Participant3 asked a question related to results of poll P1, and context preparation module 144 may determine that the question includes content for increasing John's engagement level.

Context preparation module 144 can determine any suitable content from any suitable source for increasing a participant's engagement level. In one example, context preparation module 144 determines content for increasing a participant's engagement level from a previous learning session. For instance, context preparation module 144 may determine that John has rewound the content of Slide3 and Audio3 beyond a threshold number of times, such as three times. Hence, context preparation module 144 may determine that content from a previous learning session that includes introductory material to Slide3 should be recommended to participant John to increase John's engagement level in a current learning session. Additionally or alternatively, context preparation module 144 may determine that content outside of online sessions presented by the presenter includes content for increasing a participant's engagement level, such as a textbook, a web page, a published paper, a different online course (e.g., from another presenter), combinations thereof, and the like.

Context preparation module 144 may determine any suitable correlating participant with the above data structures. In one example, context preparation module 144 determines a group of participants who each have low engagement, or appear to have a poor understanding of common content (e.g., low quiz scores, each participant rewinds a same content), so that conversation assistant module 146 may open a communication between the group of participants, such as a chat during a break of the online session. Additionally or alternatively, context preparation module 144 may determine a participant who has high engagement and a good understanding of content of the online session (e.g., high quiz scores), so that conversation assistant module 146 may open a communication between the group of students and the participant who has high engagement.

In one example, context preparation module 144 determines content to increase an engagement level of low-engagement participants by correlating data structures of participants and identifying common content rewound at least a threshold number of times by a plurality of participants. Based on the common content, context preparation module 144 can obtain introductory content (e.g., content to better understand the common content). The introductory content can be included in a communication to the participants who rewound the common content at least a threshold number of times. For instance, the introductory content may be included in a hint or recommendation provided to a low-engagement participant.

Returning again to FIG. 1, indications of content and participants determined to increase an engagement level of a participant in an online session by context preparation module 144, along with any suitable information, such as participant identities (e g, names, identification numbers, etc.), engagement scores, indications of whether participants are likely to disengage from an online session, indications of whether participants are highly engaged and likely to assist a participant who is likely to disengage from an online session, content of previous learning sessions, sources of content, such as online session numbers, web page addressed, textbook identifiers, combinations thereof, and the like, used by or calculated by context preparation module 144 are stored in context data 130 of storage 122 and made available to modules of participant engagement application 116. In one example, context preparation module 144 provides indications of content and participants determined to increase an engagement level of a participant in an online session to conversation assistant module 146.

Conversation assistant module 146 is representative of functionality of the engagement module 142 configured to communicate with a participant, presenter, or host of an online session. In one example, conversation assistant module 146 communicates content determined by context preparation module 144 to a participant identified by engagement module 142 that is likely to disengage from the online session, such as by having an engagement level below a threshold engagement level.

Conversation assistant module 146 can communicate with a participant or presenter in any suitable way, such as with a chat (e.g., a text chat), a phone call (e.g., a voice call), a text message (e.g., a message sent to a mobile phone of a participant or presenter), combinations thereof, and the like. Accordingly, conversation assistant module 146 includes an intelligent assistant that can participate in a voice conversation, text conversation, and the like. In one example, conversation assistant module 146 includes a video virtual assistant (e.g., an animated image of a person) who can communicate in a video conference with a participant of an online leaning session.

Conversation assistant module 146 can form a communication with any suitable number of people. In one example, conversation assistant module 146 communicates simultaneously with a plurality of participants of an online session in a group communication (e.g., a conference call). Additionally or alternatively, conversation assistant module 146 may simultaneously form multiple communications with multiple respective participants.

In one example, conversation assistant module 146 opens a communication channel to a presenter of an online session, such as a voice message to the presenter that is consumable by the presenter via an earpiece, a chat message to a private chat window of the presenter not viewable to participants of the online session, and the like. For instance, conversation assistant module 146 may communicate to a presenter a list of participants having engagement levels below a threshold engagement level, a number of participants having engagement levels below a threshold engagement level, content that a number of participants have rewound, combinations thereof, and the like.

Additionally or alternatively, conversation assistant module 146 can communicate to a service provider or host of an online session, such as service provider 110. For instance, conversation assistant module 146 may provide learning session data to service provider 110, such as a number of participants having engagement levels below a threshold engagement level, duration of content that participants have rewound, a type of content presented, indications of language content for which participants exhibit low engagement, combinations thereof, and the like. Accordingly, service provider 110 may change the online session to prevent participants from disengaging, such as by providing an update to distance learning application 118 (e.g., by including a language translation module to translate languages, a transcription module to automatically transcribe the presenter's speech, etc.), provide links between content of the online session so a participant can easily navigate to different parts of the online session, increase a bandwidth for the online session so that video content is displayed without undesired transmission artifacts (e.g., pixilation, video freezing, etc.).

In one example, conversation assistant module 146 opens a communication channel with a first participant and queries the first participant regarding their ability and willingness to assist a second participant (e.g., participate in a chat with the second participant). For instance, the first participant may have answered a quiz correctly while the second participant answered the quiz incorrectly. Hence, conversation assistant module 146 may pair the first participant with the second participant in a chat, voice call, etc., to increase an engagement level of the second participant in the online session.

Figure 3:
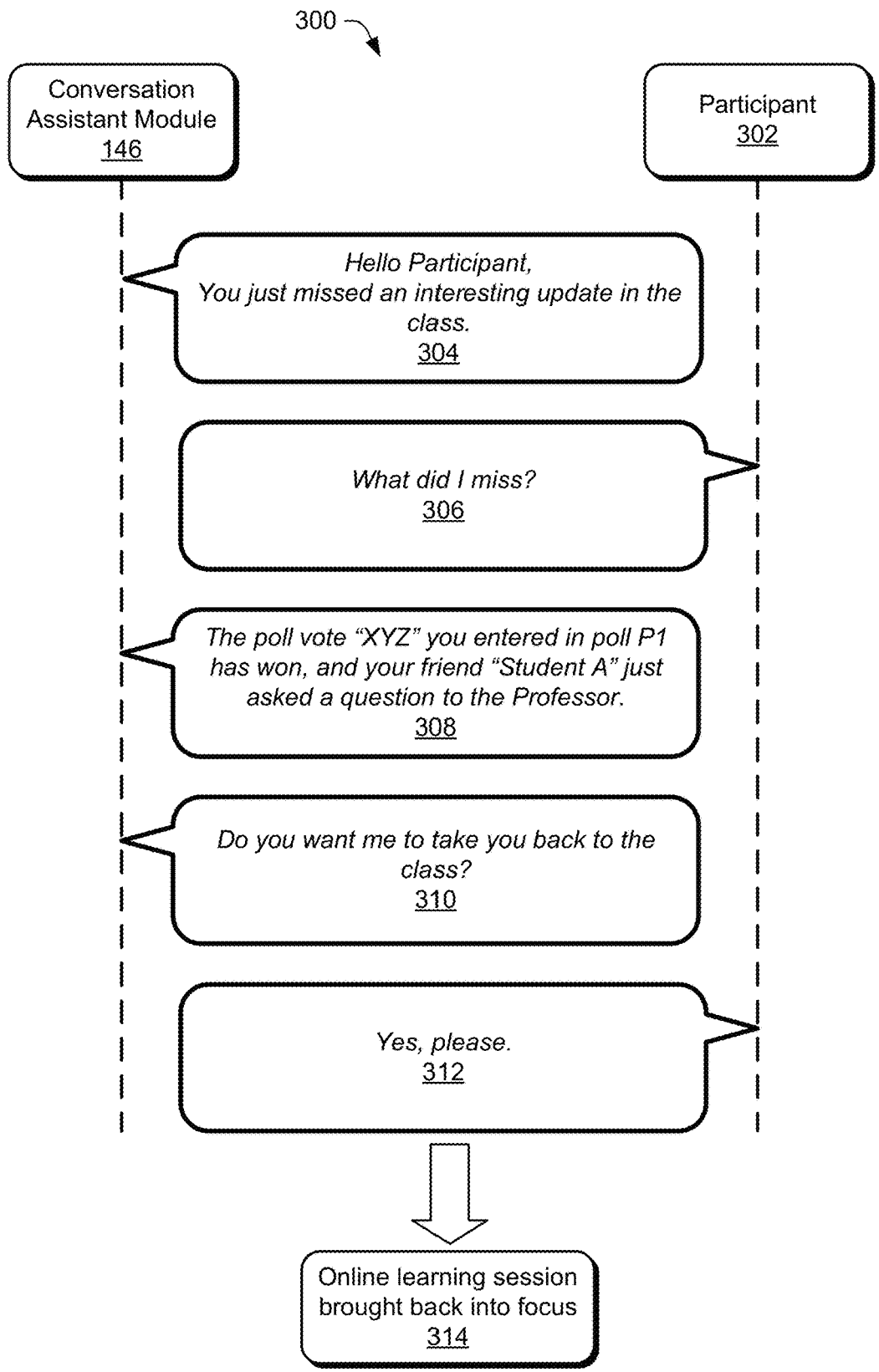
FIG. 3 illustrates an example communication in accordance with one or more aspects of the disclosure.

An example of a communication between conversation assistant module 146 and a participant of an online session is illustrated in FIG. 3. FIG. 3 illustrates an example communication 300 in accordance with one or more aspects of the disclosure. Communication 300 is an example of a communication between conversation assistant module 146 and participant 302. Participant 302 is an example of a participant determined to have an engagement level below a threshold engagement level by participant engagement system 114, such as participant John in FIG. 3.

Communication 300 may be any suitable type of communication, such as a voice conversation, a chat, or a combination thereof. At prompt 304, conversation assistant module 146 prompts the participant. For instance, participant engagement system 114 may recognize that participant 302 is not actively viewing the online session (e.g., participant 302 may have a user interface that exposes the online session minimized while rewinding and replaying content from earlier in the online session). Responsive to recognizing that participant 302 is not actively viewing the online session, and that participant 302 has an engagement level below a threshold engagement level, conversation assistant module 146 asks participant 302 at prompt 304, "Hello Participant, you just missed an interesting update in the class". Participant 302 replies at reply 306, "What did I miss". Conversation assistant module 146 answers participant 302 at prompt 308, "The poll vote 'XYZ' you entered in poll P1 has won, and your friend 'Student A' just asked a question to the professor". Conversation assistant module 146 asks participant 302 at prompt 310, "Do you want me to take you back to the class?" Participant 302 answers at reply 312, "Yes, please". Responsive to participant 302 confirming that they would like to be brought back to the class, participant engagement system 114 brings the online session back into focus at 314, such as by maximizing the online session in a user interface exposed on a computing device of participant 302.

Returning again to FIG. 1, a communication generated by conversation assistant module 146, along with any suitable information, such as participant identities (e g, names, identification numbers, etc.), content of a communication (e.g., a recording of conversation, a transcript of a conversation, text of a chat, etc.), user preferences regarding for a medium of communication, such as chat, text, phone, etc., engagement scores of participants in a communication, an indication of whether a presenter participated in a communication, combinations thereof, and the like, used by or calculated by conversation assistant module 146 are stored in conversation data 132 of storage 122 and made available to modules of participant engagement application 116. In one example, conversation assistant module 146 communicates content determined to increase an engagement level of a participant in an online session to the participant. Additionally or alternatively, conversation assistant module 146 may communicate an indication of a group of participants and an indication of learning-session content to a presenter of the learning session. For instance, a group of participants may include participants in the learning session having respective engagement levels in the learning session below a threshold engagement level for at least one time interval, and learning-session content may include content that is presented by the presenter during the at least one time interval.

Having considered an example digital medium environment, example mapping, and example communication, consider now a discussion of an example system usable to determine and facilitate participant engagement in an online session in accordance with one or more aspects of the disclosure.

Example Participant Engagement System

Figure 4:
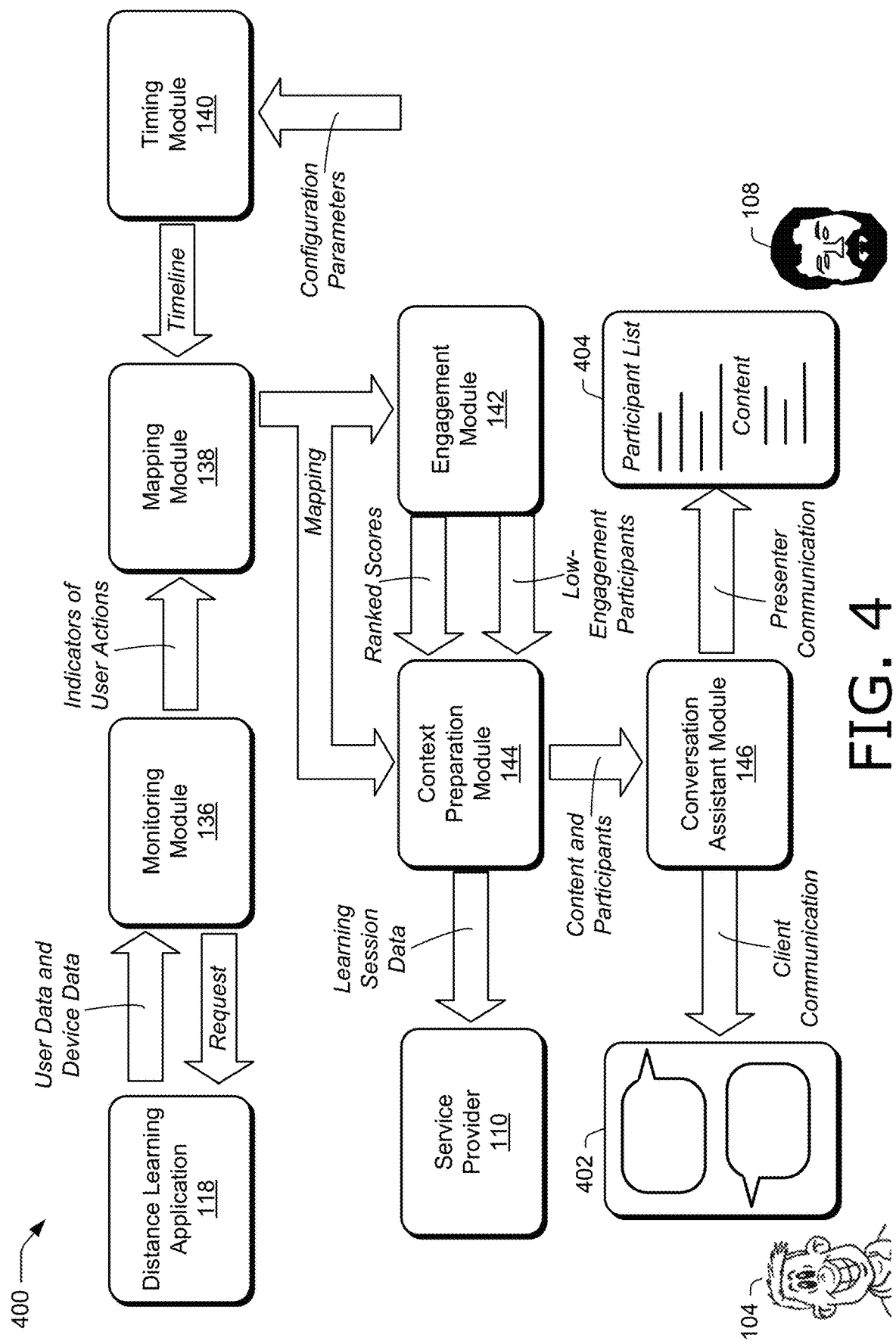
FIG. 4 illustrates an example system usable to determine and facilitate participant engagement in an online session in accordance with one or more aspects of the disclosure.

FIG. 4 illustrates an example system 400 usable to determine and facilitate participant engagement in an online session (e.g., an online learning session) in accordance with one or more aspects of the disclosure. In this implementation, system 400 includes the modules of participant engagement application 116 as described in FIG. 1, e.g., monitoring module 136, mapping module 138, timing module 140, engagement module 142, context preparation module 144, and conversation assistant module 146. System 400 is one example of a participant engagement system that can be constructed using the modules of participant engagement application 116. For instance, signals can be redefined, and modules can be modified, combined, divided, added, or removed to form a modified system, without altering the functionality of system 400. Accordingly, such modified systems are considered to be within the scope of the disclosure.

Furthermore, for simplicity discussion of system 400 is generally limited to the modules of participant engagement application 116 and distance learning application 118, with a description of some of their interconnects. System 400 can, however, include any suitable signals and communications between modules omitted for simplicity. Such signals may include system clocks, counters, data flags, sequence indicators, reset signals, iteration numbers, timestamps, and the like. In one example, system 400 can operate in real time (e.g., with no perceptible delay to a client). Accordingly, signals can be calculated by the modules of system 400 and communicated between the modules of system 400 without significant delay, so that a communication can be initiated with a participant without perceptible delay to the participant (e.g., participant 104) once the participant is determined as a low-engagement participant having an engagement level below a threshold engagement level.

Moreover, system 400 can be implemented on any suitable device or devices. In one example, system 400 is implemented on one computing device (e.g., server 112 or one of computing devices 102 in FIG. 1). In another example, system 400 is implemented on more than one computing device. For instance, parts of system 400 can be implemented by a first computing device, such as computing device 102-1 in FIG. 1, and other parts of system 400 can be implemented by an additional computing device or devices, such as computing device 102-2. In one example, a server implements at least part of system 400, such as server 112 in FIG. 1. A server can be remote, e.g., because it is not collocated with a first computing device. A server may be configured to receive signals of system 400 from a computing device (e.g., from distance learning application 118 of one or more of computing devices 102), process the received signals, and transmit results of the processing back to the computing device (e.g., by forming a communication with a participant operating the computing device). Hence, participant engagement system 114 of server 112 in FIG. 1 may include system 400. Additionally or alternatively, system 400 may include a copy of distance learning application 118.

Monitoring module 136 obtains data regarding an online session, including user data and device data (e.g., indicators of user actions). Monitoring module 136 can obtain data regarding an online leaning session in any suitable way. In one example, monitoring module 136 sends a request to distance learning application 118 (e.g., on one of computing devices 102) to obtain data regarding an online session, and distance learning application 118 may provide data regarding an online session to monitoring module 136 responsive to receiving the request. Additionally or alternatively, monitoring module 136 may obtain data regarding an online session without sending an explicit request for the data regarding an online session. For instance, distance learning application 118 may provide data regarding an online session from one of computing devices 102 to monitoring module 136 at predefined times, such as periodically, at the end of a time interval of an online session (e.g., time intervals configured by a presenter of the online session), combinations thereof, and the like. Monitoring module 136 provides indicators of user actions included in data regarding an online session to mapping module 138.

Mapping module 138 receives indicators of user actions from monitoring module 136 and a timeline of an online session from timing module 140. Timing module 140 may provide any suitable timeline, such as time intervals configured according to configuration parameters by a presenter, e.g., presenter 108. Mapping module 138 generates a mapping of indicators of user actions received from monitoring module 136 to a timeline received from timing module 140. Mapping 200 in FIG. 2 is an example of a mapping generated by mapping module 138.

Mapping 200 can generate a mapping in any suitable way. In one example, mapping 200 generates a mapping by assigning user actions at timestamps indicated by indicators of user actions from monitoring module 136 to time intervals of a timeline provided by timing module 140. For instance, timestamps of a user action from monitoring module 136 may indicate that the user action occurred from time 08:32 to time 11:02 of an online session, and mapping module 138 may map the times from 08:32 to 11:02 to an interval of a timeline, such as T3. Hence, mapping module 138 may assign the user action to time interval T3 in a mapping.

Mapping module 138 provides a mapping to engagement module 142 and context preparation module 144. Engagement module 142 determines one or more participants in an online session having an engagement level in the online session below a threshold engagement level. Engagement module 142 can determine participants having an engagement level below a threshold engagement level in any suitable way.

In one example, engagement module 142 assigns an engagement score to each participant in an online session, and updates the engagement scores throughout the online session, such as at time intervals defined by presenter 108. Engagement module 142 may assign engagement scores based on a mapping generated by mapping module 138. For instance, engagement module 142 can assign weights to user actions indicated in a mapping and combine the weights, (e.g., average the weights, sum the weights, etc.) to determine a respective engagement score of a participant at each time interval.

Additionally or alternatively, engagement module 142 may rank participants according to their respective engagement scores, and determine one or more participants having an engagement level below a threshold engagement level according to the ranking. For instance, engagement module 142 may take a percentile of the ranking as low-engagement participants (e.g., the bottom 30% of the ranking), applying a threshold engagement score to the ranking and taking those participants having respective engagement scores below the threshold engagement score as low-engagement participants, combinations thereof, and the like.

In one example, engagement module 142 determines one or more participants having an engagement level above a threshold engagement level, such as high-performing participants, e.g. participants who answer quizzes correctly, drive discussions in a chat, cause other participants to participate in a chat, and the like. Hence, system 400 may pair low-engagement participants determined by engagement module 142 with other low-engagement participants determined by engagement module 142, high-engagement participants determined by engagement module 142, or combinations thereof. In one example, engagement module 142 determines a high-engagement participant for content of an online session that engagement module 142 has also determined a low-engagement participant. System 400 may communicate with the high-engagement participant, such as with a chat, text message, or voice call, to determine whether the high-engagement participant is willing to tutor the low-engagement participant, such as via a chat, text message, or voice call with the low-engagement participant.

Engagement module 142 provides a list of participants to context preparation module 144. In one example, engagement module 142 provides a list of low-engagement participants (e.g., one or more participants in an online session having an engagement level in the online session below a threshold engagement level) to context preparation module 144. Additionally or alternatively, engagement module 142 provides can provide a list of high-engagement participants (e.g., one or more participants in an online session having an engagement level in the online session above a different threshold engagement level) to context preparation module 144. In one example, engagement module 142 provides a list of ranked engagement scores for participants to context preparation module 144, such as at each predetermined time interval of a timeline.

Context preparation module 144 receives a list of participants (e.g., low-engagement participants) from engagement module 142 and a mapping from mapping module 138. Context preparation module 144 determines context of an online session (e.g., content and participants) for increasing an engagement level of a low-engagement participant identified on a list of participants from engagement module 142. Context preparation module 144 can determine context (e.g., content and participants) for increasing an engagement level of a low-engagement participant in any suitable way.

In one example, context preparation module 144 determines participants of the learning session that correlate to a low-engagement participant based on a mapping generated by mapping module 138. For instance, context preparation module 144 may determine participants of the learning session that correlate to a low-engagement participant by identifying participants via the mapping that participated in a same chat, or a chat with a same or similar topic, as a low-engagement participant. Context preparation module 144 may then determine content for increasing the engagement level of the low-engagement participant based on the participants identified from the mapping, such as content related to a question asked by a participant who participated in a same chat as the low-engagement participant.

Additionally or alternatively, context preparation module 144 may determine content for increasing an engagement level of a low-engagement participant from a different online session as a current online session, such as an online session from a previous class of the same course as the current online session, an online session from a different class (e.g., from a different presenter than presenter 108), an online session from a different solution provider (e.g., a different solution provider than service provider 110) hosting a current online session, combinations thereof, and the like.

Context preparation module 144 provides context (e.g., content and identifiers of participants) for increasing an engagement level of a low-engagement participant to conversation assistant module 146. In one example, context preparation module 144 provides learning session data to service provider 110 hosting the online session. For instance, context preparation module 144 may provide data regarding low-engagement participants, without explicitly identifying the low-engagement participants, such as a number of low-engagement participants during each time interval of an online session, content for which participants are low-engaging, and the like, to service provider 110. Service provider 110 may take steps to increase the engagement level of low-engaging participants, such as increasing a bandwidth for the online session during high-bandwidth time intervals, (e.g., time intervals when presenter 108 presents video content), based on the data received from context preparation module 144 and system 400.

Conversation assistant module 146 communicates context determined by context preparation module 144 to a participant in an online session, such as a low-engagement participant (e.g., participant 104), a presenter (e.g., presenter 108), or a combination thereof. In the example in FIG. 4, conversation assistant module 146 forms a client communication with participant 104 and a presenter communication with presenter 108. Conversation assistant module 146 forms a client communication with participant 104, illustrated in FIG. 4 as dialog box 402. Dialog box 402 can indicate any suitable communication between conversation assistant module 146 and participant 104, such as a chat, phone call, audio conference, video conference, text, combinations thereof, and the like. Communication 300 in FIG. 3 is an example of a client communication between conversation assistant module 146 and participant 104.

Conversation assistant module 146 also forms a presenter communication with presenter 108, illustrated in FIG. 4 as communication 404. Communication 404 can indicate any suitable communication between conversation assistant module 146 and presenter 108, such as a chat, phone call, audio conference, video conference, text, combinations thereof, and the like. In the example in FIG. 4, communication 404 includes a participant list (e.g. a list of low-engagement participants) and a list of content (e.g., content presented during the online session for which participants are identified as low-engagement participants).

System 400 can perform any operation described above at any suitable time. For instance, system 400 may obtain user data and device data from distance learning application 118 and determine low-engagement participants for time intervals defined by configuration parameters provided to timing module 140. Hence, system 400 may form a communication to a participant or presenter multiple times during an online session.

System 400 constitutes an improvement over systems that do not track participant engagement in an online session. By monitoring user actions during an online session, system 400 accurately tracks engagement levels of participants during an online session relative to content of the online session. Hence, system 400 can efficiently identify low-engagement participants having a high probability of dropping out of an online session, and actively communicate context for the online session (e.g., content and other participant identities) to increase a participant's engagement level in the online session. Furthermore, system 400 can communicate context of an online session to a presenter of an online session, so the presenter can take active steps to assist low-engagement participants during the online session, such as by revisiting a topic already presented. Accordingly, system 400 increases the usefulness of an online session by increasing the engagement level of low-engagement participants and preventing them from dropping out of the online session, making the online session efficient for the participants and the presenter.

Having considered an example system 400, consider now a discussion of example procedures for improving participant engagement in an online session in accordance with one or more aspects of the disclosure.

Example Procedures

Figure 5:
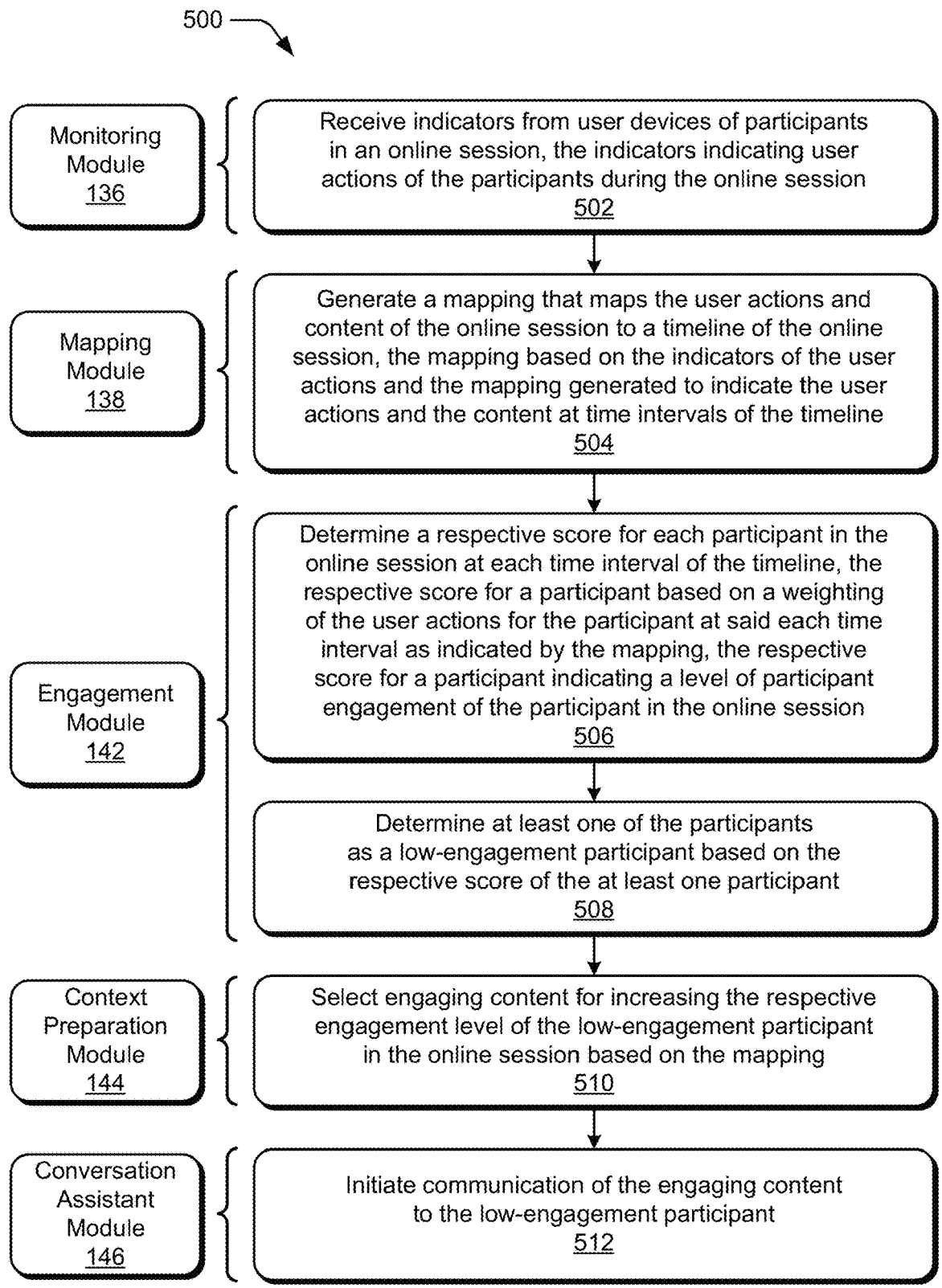
FIG. 5 illustrates a flow diagram depicting an example procedure in accordance with one or more aspects of the disclosure.

FIG. 5 illustrates an example procedure 500 for detecting and controlling participant engagement in an online session in accordance with one or more aspects of the disclosure. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more components of server 112 of FIG. 1 that make use of a participant engagement system, e.g., participant engagement system 114. A participant engagement system implementing procedure 500 may be an independent application that has been installed on the computing device, a service hosted by a service provider that is accessible by the computing device, a plug-in module to the computing device, or combinations thereof.

Indicators are received from user devices of participants in an online session, the indicators indicating user actions of the participants during the online session (block 502). In one example, monitoring module 136 receives indicators from user devices of participants in an online session, the indicators indicating user actions of the participants during the online session. The user devices may include a user device of a presenter of the online session. In one example, the indicators indicate a level of user participation in at least one of a poll, a quiz, or a chat of the online session. Additionally or alternatively, the user actions can include at least one of minimizing a user interface via which the online session is displayed at a respective user device, turning off a sound device, or rewinding a part of the online session, pausing a topic of the online session, answering a quiz of the online session, entering a selection in a poll of the online session, or entering text in a chat of the online session.

In another example, the user actions include presenter actions that change displayed content at the user devices during the online session, and the indicators include a designator of a rate at which the displayed content is changed. Additionally or alternatively, receiving indicators can be repeated during the online session for a plurality of time intervals, such as time intervals defined by a presenter of the online session or a solution provider hosting the learning session, such as presenter 108 and service provider 110, respectively, in FIG. 1.

A mapping is generated to map the user actions and content of the online session to a timeline of the online session, where the mapping is based on the indicators of the user actions and the mapping is generated to indicate the user actions and the content at time intervals of the timeline (block 504). For example, mapping module 138 generates a mapping of the user actions and content of the online session to a timeline of the online session, where the mapping is based on the indicators of the user actions and the mapping is generated to indicate the user actions and the content at time intervals of the timeline.

A respective score for each participant in the online session is determined at each time interval of the timeline, the respective score for a participant based on a weighting of the user actions for the participant at said each time interval as indicated by the mapping, the respective score indicating a level of participant engagement of the participant in the online session (block 506). For example, engagement module 142 determines a respective score for each participant in the online session at each time interval of the timeline, where the respective score for a participant is based on a weighting of the user actions for the participant at said each time interval as indicated by the mapping, and the respective score indicates a level of participant engagement of the participant in the online session.

At least one of the participants is determined as a low-engagement participant based on the respective score of the at least one participant (block 508). For example, engagement module 142 determines levels of participant engagement in the online session based on the mapping of the user actions and the content, and determines at least one of the participants as a low-engagement participant based on the respective score of the at least one participant.

Content is selected for increasing the respective engagement level of the low-engagement participant in the online session based on the mapping (block 510). For example, context preparation module 144 selects engaging content for increasing the respective engagement level of the low-engagement participant in the online session based on the mapping. Additionally or alternatively, the content can include a reference to an earlier portion of the online session than a current portion of the online session, or reference to a different online session. In one example, context preparation module 144 is configured to select the engaging content by determining other participants of the online session that correlate to the low-engagement participant based on the mapping, and selecting the content based on the other participants. Additionally or alternatively, the content is selected to increase the respective engagement level of the low-engagement participant, and can include content common to the other participants and the low-engagement participant, such as content referenced in a chat participated in by the low-engagement participant and the other participants.

Communication of the engaging content to the low-engagement participant is initiated (block 512). For example, conversation assistant module 146 initiates communication of the engaging content to the low-engagement participant in an effort to increase the engagement level of the low-engagement participant of the online session. In one example, the content is initiated for communication to the low-engagement participant as at least one of a voice call or a chat message with the low-engagement participant during the online session. A voice call or chat may be formed as part of the communication based on user preferences of the low-engagement participant. Additionally or alternatively, conversation assistant module 146 can be configured to initiate communication of an indicator of the engaging content selected for increasing the respective engagement level of the low-engagement participant to a presenter of the online session.

In one example, engagement module 142 is configured to determine at least one additional participant as an engaged participant in the online session based on the respective score of the additional participant being greater than a threshold engagement score, and conversation assistant module 146 is configured to establish communication between the low-engagement participant and the engaged participant. Additionally or alternatively, communicating the content to the low-engagement participant can include opening a communication between the low-engagement participant and an additional participant having a respective engagement level in the online session above a threshold engagement level, such as a high-engagement participant.

Figure 6:
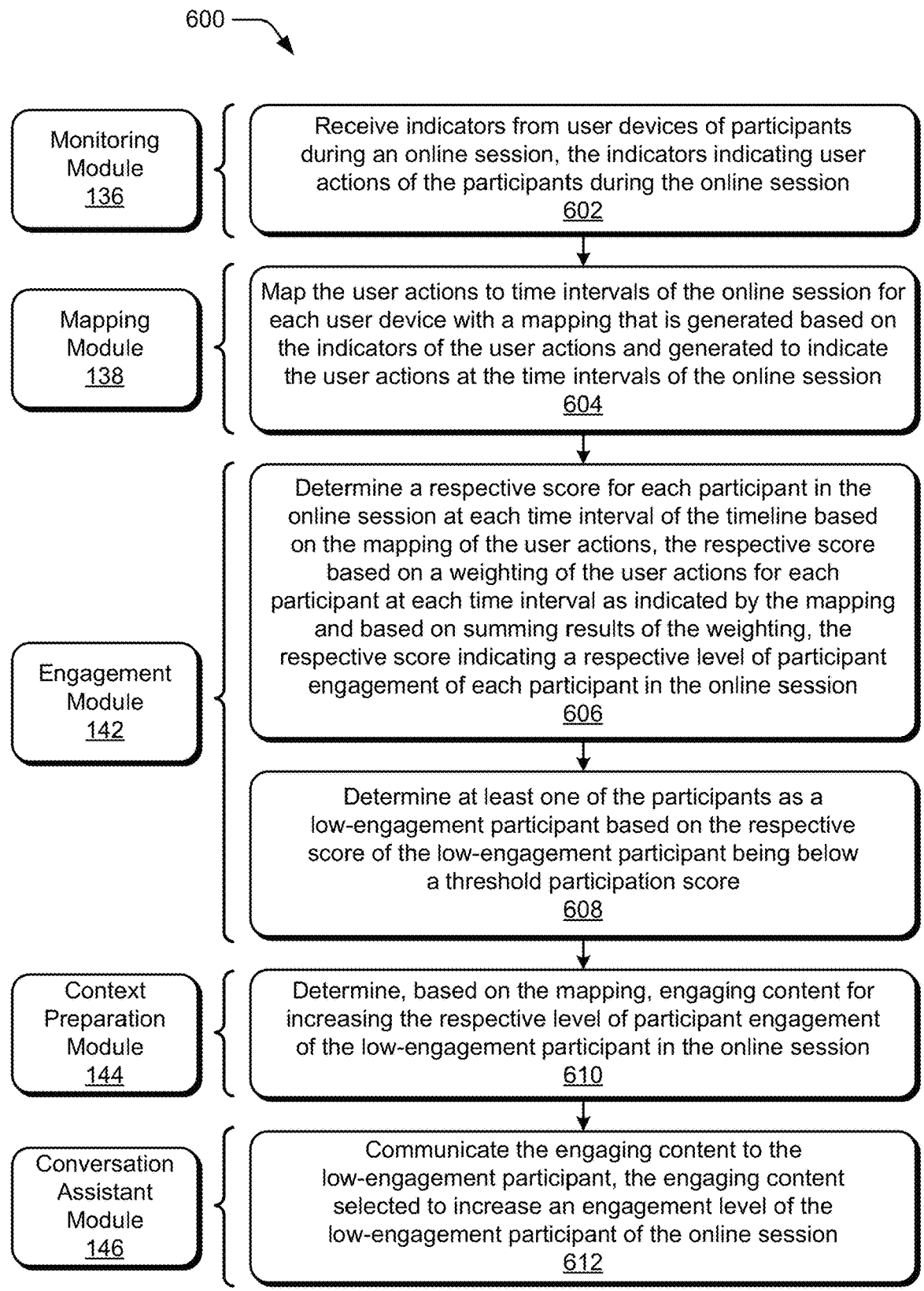
FIG. 6 illustrates a flow diagram depicting an example procedure in accordance with one or more aspects of the disclosure.

FIG. 6 illustrates an example procedure 600 for detecting and controlling participant engagement in an online session in accordance with one or more aspects of the disclosure. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more components of server 112 of FIG. 1 that make use of a participant engagement system, e.g., participant engagement system 114. A participant engagement system implementing procedure 600 may be an independent application that has been installed on the computing device, a service hosted by a service provider that is accessible by the computing device, a plug-in module to the computing device, or combinations thereof.

Indicators are received from user devices of participants during an online session, the indicators indicating user actions of the participants during the online session (block 602). For example, monitoring module 136 receives indicators from user devices of participants during an online session, the indicators indicating user actions of the participants during the online session. In one example, the user actions include at least one of answering a quiz of the online session, entering a selection in a poll of the online session, or entering text in a chat of the online session. Additionally or alternatively, the indicators can be packaged in respective data structures for the participants in the online session, each data structure indicating one of the time intervals, content presented during the one of the time intervals, and at least one user action during the one of the time intervals.

The user actions are mapped to time intervals of the online session for each user device, where a mapping is generated based on the indicators of the user actions and the mapping is generated to indicate the user actions at the time intervals of the online session (block 604). For example, mapping module 138 generates a mapping of the user actions to time intervals of the online session for each user device, where the mapping is based on the indicators of the user actions and the mapping is generated to indicate the user actions at the time intervals of the online session. Additionally or alternatively, mapping module 138 generates a mapping that can include an indication of presenter content at the time intervals of the timeline for the online session.

A respective score for each participant in the online session at each time interval of the timeline is determined based on the mapping of the user actions, the respective score based on a weighting of the user actions for each participant at each time interval as indicated by the mapping and based on summing results of the weighting, the respective score indicating a respective level of participant engagement of each participant in the online session (block 606). For example, engagement module 142 determines a respective score for each participant in the online session at each time interval based on the mapping of the user actions, where the respective score is based on a weighting of the user actions for each participant at each time interval as indicated by the mapping and based on summing results of the weighting, the respective score indicating a level of participant engagement of each participant in the online session.

At least one of the participants is determined as a low-engagement participant based on the respective score of the low-engagement participant being below a threshold participation score (block 608). In one example, engagement module 142 determines at least one participant as a low-engagement participant based on the respective score of the low-engagement participant being below a threshold participation score.

Based on the mapping, engaging content for increasing the respective level of participant engagement of the low-engagement participant in the online session is determined (block 610). For example, context preparation module 144 determines, based on the mapping, engaging content for increasing the respective level of participant engagement of the low-engagement participant in the online session. Additionally or alternatively, the mapping can include indicators of presenter content at the time intervals.

The engaging content is communicated to the low-engagement participant, where the content is selected to increase an engagement level of the low-engagement participant of the online session (block 612). For example, conversation assistant module 146 communicates the content to the low-engagement participant. In one example, other participants of the online session are identified who correlate to the low-engagement participant, and identities of the other participants are communicated to the low-engagement participant. Hence, the low-engagement participant may contact the other participants, such as to ask a question regarding the content via a chat message. Additionally or alternatively, conversation assistant module 146 communicates an indication of the low-engagement participant to a presenter of the online session.

In one example, context preparation module 144 determines other participants of the online session that correlate to the low-engagement participant based on the mapping. For instance, context preparation module 144 may correlate entries of data structures for each participant based on the mapping to determine other participants of the online session that correlate with the low-engagement participant. For example, context preparation module 144 determines content for increasing the engagement level of the low-engagement participant in the online session based on the other participants. For instance, context preparation module 144 may correlate entries of respective data structures for identified correlating participants to determine content of the learning session for increasing the engagement level of the low-engagement participant.

Figure 7:
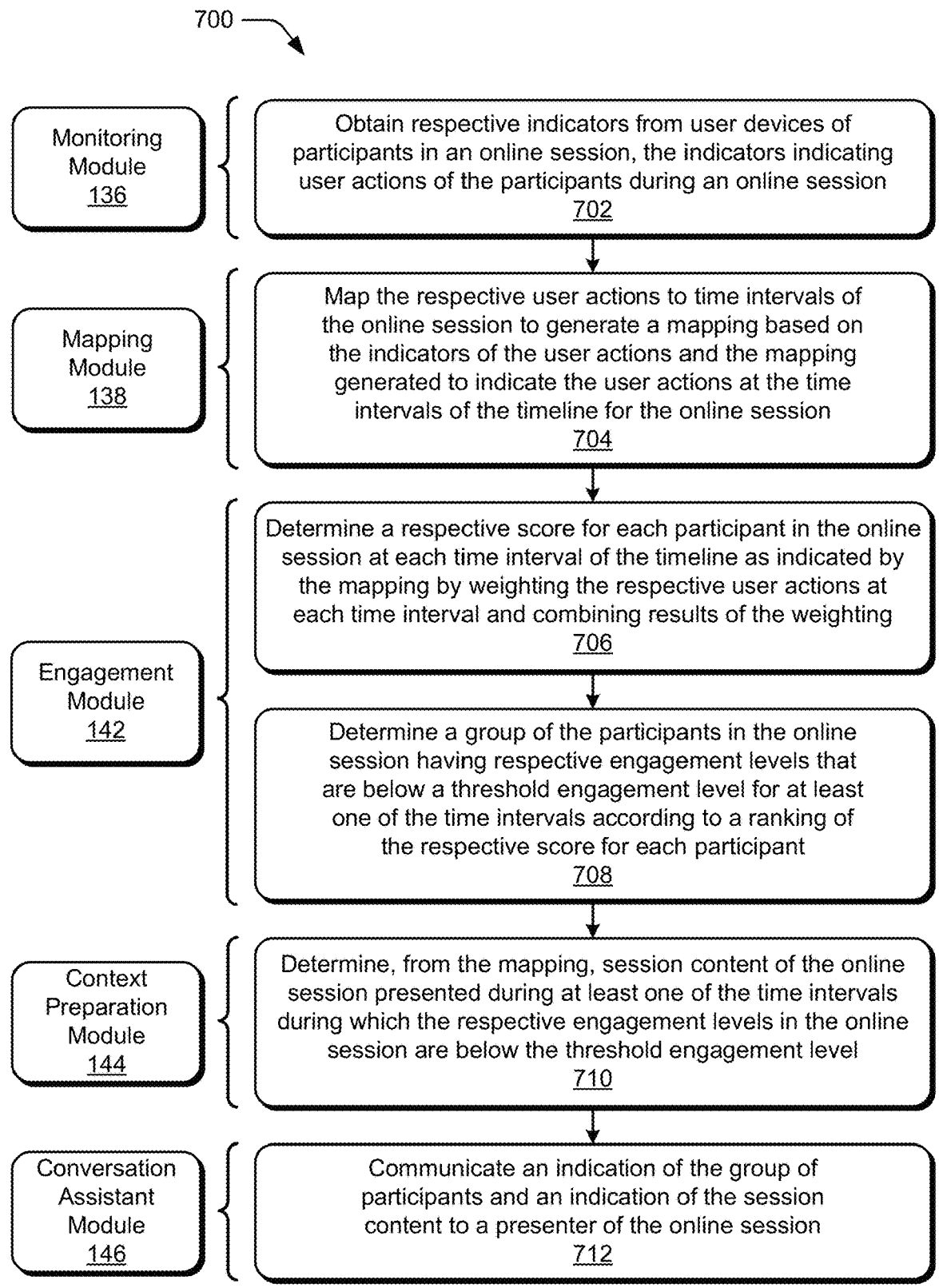
FIG. 7 illustrates a flow diagram depicting an example procedure in accordance with one or more aspects of the disclosure.

FIG. 7 illustrates an example procedure 700 for detecting and controlling participant engagement in an online session in accordance with one or more aspects of the disclosure. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more components of server 112 of FIG. 1 that make use of a participant engagement system, e.g., participant engagement system 114. A participant engagement system implementing procedure 700 may be an independent application that has been installed on the computing device, a service hosted by a service provider that is accessible by the computing device, a plug-in module to the computing device, or combinations thereof.

Respective indicators are obtained from user devices of participants in an online session, the indicators indicating user actions of the participants during an online session (block 702). In one example, monitoring module 136 obtains respective indicators from user devices indicating respective user actions of the participants during an online session. The respective user actions are mapped to time intervals of the online session to generate a mapping based on the indicators of the user actions and the mapping generated to indicate the user actions at the time intervals of the timeline for the online session (block 704). In one example, mapping module 138 generates a mapping that maps the respective user actions to time intervals of the online session, where the mapping is based on the indicators of the user actions and the mapping is generated to indicate the user actions at the time intervals of the timeline for the online session. The time intervals can be configurable by a presenter or solution provider of the learning session.

A respective score for each participant in the online session at each time interval of the timeline is determined as indicated by the mapping by weighting the user actions at each time interval and combining results of the weighting (block 706). In one example, engagement module 142 determines a respective score for each participant in the online session at each time interval of the timeline as indicated by the mapping by weighting the user actions at said each time interval and combining results of the weighting.

A group of the participants is determined from the online session having respective engagement levels that are below a threshold engagement level for at least one of the time intervals according to a ranking of the respective score for each participant (block 708). For example, engagement module 142 determines a group of participants in the online session having respective engagement levels that are below a threshold engagement level for at least one of the time intervals according to a ranking of the respective score for each participant. Session content of the online session presented during at least one of the time intervals is determined (block 710). For example, context preparation module 144 determines session content presented during at least one of the time intervals during which the respective engagement levels in the online session are below the threshold engagement level.

An indication of the group of participants and an indication of the session content are communicated to a presenter of the learning session (block 712). For example, conversation assistant module 146 communicates an indication of the group of participants and an indication of the session content to a presenter of the learning session. Additionally or alternatively, conversation assistant module 146 can open a communication channel among the group of participants (e.g., between participants in the group of participants). In one example, context preparation module 144 determines, from the mapping, common content for the group of participants for a different time interval than the at least one of the time intervals, and obtains additional content based on the common content, the additional content not presented during the online session. Conversation assistant module 146 can communicate the additional content to the group of participants.

The procedures described herein constitute an improvement over procedures that do not track participant engagement in an online session. By monitoring user actions during an online session, the procedures described herein track engagement levels of participants during an online session relative to content of the online session. Hence, the procedures described herein can identify low-engagement participants having a high probability of dropping out of an online session, and actively communicate context for the online session (e.g., content and other participant identities) to increase a participant's engagement level in the online session. Furthermore, the procedures described herein can communicate context of an online session to a presenter of an online session, so the presenter can take active steps to assist low-engagement participants during the online session. Accordingly, the procedures described herein increase the usefulness of an online session by increasing the engagement level of low-engagement participants and preventing them from dropping out of the online session, making the online session efficient for the participants and the presenter.

Having considered example procedures in accordance with one or more implementations, consider now example systems and devices that can be utilized to practice the inventive principles described herein.

Example Systems and Devices

FIG. 8 illustrates an example system generally at 800 that includes example computing devices 802 (shown as 802-1 through 802-5). Computing devices 802 can be any suitable computing device (e.g., user computing devices). Computing devices 102 in FIG. 1 are examples of computing devices 802. Computing devices 802 may include an on-chip system, multiple computing devices, combinations thereof, or any other suitable computing device or computing system. Accordingly, FIG. 8 illustrates computing devices 802 as one or more of a tablet, a laptop computer, a smart phone, smart eye glasses, and a camera, though these examples are illustrative and in no way are meant to limit the type or number of devices included in computing devices 802.

Furthermore, computing devices 802 are coupled to "cloud" 804 including platform 806 that is representative of one or more computing systems and devices that may implement the various techniques described herein, such as edge servers, global servers, or combinations thereof. This is illustrated through inclusion of participant engagement application 116, participant engagement system 114, and server 112 in modules of platform 806, which operate as described above.

Functionality of computing devices 802 may be implemented all or in part through use of a distributed system, such as over a "cloud" 804 via a platform 806. Furthermore, platform 806 may host data accessible by computing devices 802, and therefore computing devices 802 may be required to be authenticated to platform 806.

Platform 806 includes a processing system 808, one or more computer-readable media 810, and one or more I/O interfaces 812 that are communicatively coupled to each other. Although not shown, platform 806 may further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

Processing system 808 is representative of functionality to perform one or more operations using hardware. Accordingly, processing system 808 is illustrated as including hardware elements 814 that may be configured as processors, functional blocks, and so forth. This may include implementation in hardware as an application specific integrated circuit or other logic device formed using one or more semiconductors. Hardware elements 814 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions. Processors 120 in FIG. 1 are examples of processing system 808.

Computer-readable media 810 (e.g., computer-readable storage media) is illustrated as including memory/storage 816. Storage 122 in FIG. 1 is an example of memory/storage included in memory/storage 816. Memory/storage 816 may include volatile media (such as random access memory (RAM)), nonvolatile media (such as read only memory (ROM), Flash memory, optical disks, magnetic disks, and so forth), or combinations thereof. Memory/storage 816 may include fixed media (e.g., RAM, ROM, a fixed hard drive, and so on) as well as removable media (e.g., Flash memory, a removable hard drive, an optical disc, and so forth). Computer-readable media 810 may be configured in a variety of other ways as further described below.

Input/output interface(s) 812 are representative of functionality to allow a user (e.g., a system administrator of platform 806) to enter commands and information to platform 806, and also allow information to be presented to the user and other components or devices using various input/output devices. Examples of input devices include a keyboard, a cursor control device (e.g., a mouse), a microphone, an array of microphones, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, platform 806 may be configured in a variety of ways as further described below to support user interaction.

Platform 806 also includes applications 818. Applications 818 are representative of any suitable applications capable of running on platform 806, and may include a web browser which is operable to access various kinds of web-based resources (e.g., assets, media clips, images, content, configuration files, services, user profiles, advertisements, coupons, and the like. Applications 818 include participant engagement application 116 and distance learning application 118, as previously described. Furthermore, applications 818 includes any applications supporting participant engagement system 114 or system 400.

Cloud 804 includes and is representative of a platform 806. Platform 806 abstracts underlying functionality of hardware (e.g., servers) and software resources of cloud 804, and includes resources 820. Resources 820 may include applications, data, services, and content that can be utilized while computer processing is executed on servers that are remote from computing devices 802. Resources 820 can also include services provided over the Internet, through a subscriber network, such as a cellular or Wi-Fi network, or combinations thereof.

Resources 820 include learning session store 822, which operates to provide data for an online session to one of computing devices 802, such as a user interface for an online session, content for an online session (e.g., presenter slides), combinations thereof, and the like. Hence, resources 820 may have access to a service provider that hosts online sessions, such as service provider 110 in FIG. 1, and a presenter of an online session.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by platform 806. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the platform 806, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 814 and computer-readable media 810 are representative of modules, programmable device logic, fixed device logic implemented in a hardware form, or combinations thereof that may be employed in some aspects to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more hardware elements 814, or combinations thereof. Platform 806 may be configured to implement particular instructions and functions corresponding to the software and hardware modules. Accordingly, implementation of a module that is executable by platform 806 as software may be achieved at least partially in hardware, e.g., through use of computer-readable storage media and hardware elements 814 of processing system 808. The instructions and functions may be executable/operable by one or more articles of manufacture (for example, processing system 808) to implement techniques, modules, and examples described herein.

CONCLUSION

In one or more implementations, a digital medium environment includes at least one computing device. Systems, devices, and techniques are described herein for improving participant engagement in an online session, such as an online learning session. User actions during an online session are monitored, and engagement levels of participants are tracked. Low-engagement participants having an engagement level below a threshold engagement level, and therefore having a high probability of dropping out of the online session, are identified. Content is determined to increase an engagement level of low-engagement participants, and a communication channel is opened to communicate the content to the low-engagement participant. Furthermore, identifiers of content and low-engagement participants can be communicated to a presenter of an online session, so the presenter can take active steps to assist low-engagement participants during the online session. Accordingly, the usefulness of an online session is improved by increasing the engagement level of low-engagement participants and preventing them from dropping out of the online session, making the online session efficient for the participants and the presenter.

Although implementations of a participant engagement detection and control system in online sessions have been described in language specific to features and/or methods, the appended claims are not necessarily limited to the specific features or methods described. Rather, the specific features and methods are disclosed as example implementations of a participant engagement detection and control system in online sessions, and other equivalent features and methods are intended to be within the scope of the appended claims. Further, various different examples are described and it is to be appreciated that each described example can be implemented independently or in connection with one or more other described examples.

The invention claimed is:

1. A participant engagement system implemented by a computing device in a digital medium environment, the participant engagement system including modules implemented at least partially in hardware of the computing device, the participant engagement system comprising:
a monitoring module to receive indicators from user devices of participants in an online session, the indicators indicating user actions of the participants during the online session;
a mapping module to generate a mapping of the user actions and content of the online session to a timeline of the online session, the mapping based on the indicators of the user actions and the mapping generated to indicate the user actions and the content at time intervals of the timeline;
an engagement module to determine levels of participant engagement in the online session based on the mapping of the user actions and the content, the engagement module configured to:
determine a respective score for each participant in the online session at each time interval of the timeline, the respective score for the participant based on a weighting of the user actions for the participant at the time interval as indicated by the mapping, the respective score indicating a level of participant engagement of the participant in the online session; and
determine at least one of the participants as a low-engagement participant based on the respective score of the at least one participant; and a context preparation module to:
determine correlating participants to the low-engagement participant by correlating contents of the mapping; and
determine engaging content to communicate to the low-engagement participant to increase the level of participant engagement of the low-engagement participant during the online session, the engaging content including instructor content presented by an instructor of the online session during one or more of the time intervals of the timeline when the correlating participants performed a common user action.

2. The participant engagement system as described in claim 1, wherein the user actions include at least one of minimizing a user interface via which the online session is displayed at a respective user device, turning off a sound device, or rewinding a part of the online session.

3. The participant engagement system as described in claim 1, wherein the user devices include a user device of the instructor of the online session.

4. The participant engagement system as described in claim 1, wherein the user actions include instructor actions that change displayed content at the user devices during the online session, and the indicators include a designator of a rate at which the displayed content is changed.

5. The participant engagement system as described in claim 1, wherein the engagement module is configured to initiate communication of the engaging content to the low-engagement participant as at least one of a voice call or a chat message with the low-engagement participant during the online session.

6. The participant engagement system as described in claim 1, wherein the engagement module is configured to initiate communication of an indicator of the engaging content and an additional indicator of the low-engagement participant to the instructor of the online session.

7. The participant engagement system as described in claim 1, wherein the engagement module is configured to:
determine at least one additional participant as an engaged participant in the online session based on the respective score of the at least one additional participant being greater than a threshold engagement score; and
establish communication between the low-engagement participant and the engaged participant.

8. The participant engagement system as described in claim 1, wherein the engagement module is configured to initiate communication of the engaging content to the low-engagement participant and the engaging content further includes a reference to an additional online session that corresponds to an earlier class of a same course as the online session.

9. The participant engagement system as described in claim 1, further comprising a timing module configured to receive configuration parameters that indicate a number of the time intervals of the time line from the instructor of the online session who presents the instructor content during the online session.

10. In a digital medium environment for a participant engagement system, a method implemented by a computing device, the method comprising:
- receiving indicators from user devices of participants during an online session, the indicators indicating user actions of the participants during the online session;
- generating a mapping of the user actions to time intervals of the online session for each user device, the mapping based on the indicators of the user actions and the mapping generated to indicate the user actions at the time intervals of the online session;
- determining a respective score for each participant in the online session at each time interval based on the mapping of the user actions, the respective score based on a weighting of the user actions for the participant at the time interval as indicated by the mapping and summing results of the weighting, the respective score indicating a level of participant engagement of the participant in the online session;
- determining at least one of the participants as a low-engagement participant based on the respective score of the low-engagement participant being below a threshold participation score;
- determining correlating participants to the low-engagement participant by correlating contents of the mapping; and
- determining engaging content to communicate to the low-engagement participant to increase the level of participant engagement of the low-engagement participant during the online session, the engaging content including instructor content presented by an instructor of the online session during one or more of the time intervals of the timeline when the correlating participants performed a common user action.

11. The method as described in claim 10, further comprising
- communicating identities of the correlating participants to the low-engagement participant.

12. The method as described in claim 10, wherein the user actions include at least one of answering a quiz of the online session, entering a selection in a poll of the online session, or entering text in a chat of the online session.

13. The method as described in claim 10, further comprising communicating an indication of the low-engagement participant to the instructor of the online session.

14. The method as described in claim 10, wherein the common user action includes rewinding common content a threshold number of times.

15. In a digital medium environment for a participant engagement system, a method implemented by at least one computing device, the method comprising:
- obtaining indicators from user devices of participants in an online session, the indicators indicating user actions of the participants during the online session;
- a step for generating a mapping of the user actions to a timeline of the online session, the mapping based on the indicators of the user actions and the mapping generated to indicate the user actions at time intervals of the timeline for the online session;
- a step for determining a respective score for each participant in the online session at each time interval of the timeline as indicated by the mapping by weighting the user actions at the time interval and combining results of the weighting;
- a step for determining a group of the participants of the online session having respective engagement levels that are below a threshold engagement level for at least one of the time intervals according to a ranking of the scores for the participants;
- a step for determining, from the mapping, instructor content of the online session presented by an instructor of the online session during the at least one time interval; and
- a step for communicating, to the instructor of the online session, an indication of the group of the participants and an additional indication of the instructor content presented by the instructor during the at least one time interval when the participants of the group have the respective engagement levels that are below the threshold engagement level.

16. The method as described in claim 15, further comprising opening a communication channel among the group of the participants.

17. The method as described in claim 15, further comprising:
- determining, from the mapping, common content for the group of the participants for a different time interval than the at least one time interval;
- obtaining additional content based on the common content, the additional content not presented during the online session; and
- communicating the additional content to the group of the participants.

18. The method as described in claim 15, further comprising:
- assigning priorities to at least some participants in the group of participants based on the scores of the at least some participants declining at a rate during the online session greater than a threshold decline rate; and
- communicating engaging content to the at least some participants before other participants in the group of participants based on the priorities assigned to the at least some participants, the engaging content selected to increase the engagement levels of the group of participants during the online session.

19. The method as described in claim 15, further comprising:
- communicating a number of the participants in the group of participants to a service provider that hosts the online session; and
- receiving an update to the online session from the service provider that increases a bandwidth of the online session.

20. The method as described in claim 15, further comprising:
- communicating, to a service provider that hosts the online session, indications of language content for which the group of participants have the respective engagement levels that are below the threshold engagement level; and
- receiving, from the service provider, a transcription module for transcribing instructor speech of the instructor during the online session.

* * * * *